(12) United States Patent
Ishida et al.

(10) Patent No.: US 11,152,883 B2
(45) Date of Patent: Oct. 19, 2021

(54) CONTROL DEVICE FOR POLE-NUMBER SWITCHING ELECTRIC MOTOR

(71) Applicant: DENSO CORPORATION, Kariya (JP)

(72) Inventors: Jun Ishida, Kariya (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/997,393

(22) Filed: Aug. 19, 2020

(65) Prior Publication Data

US 2020/0382039 A1 Dec. 3, 2020

Related U.S. Application Data

(63) Continuation of application No. PCT/JP2019/005563, filed on Feb. 15, 2019.

(30) Foreign Application Priority Data

Feb. 19, 2018 (JP) .............................. JP2018-027297

(51) Int. Cl.
*H02P 25/20* (2006.01)
*H02P 27/12* (2006.01)
*H02P 21/22* (2016.01)

(52) U.S. Cl.
CPC .............. *H02P 25/20* (2013.01); *H02P 21/22* (2016.02); *H02P 27/12* (2013.01)

(58) Field of Classification Search
CPC ...... H02P 2205/01; H02P 25/20; H02P 21/22; H02P 27/12
See application file for complete search history.

(56) References Cited

U.S. PATENT DOCUMENTS

| | | | | |
|---|---|---|---|---|
| 3,673,477 A | * | 6/1972 | Broadway | H02K 17/14 318/773 |
| 3,794,870 A | * | 2/1974 | Broadway | H02K 3/28 310/180 |
| 6,008,616 A | * | 12/1999 | Nagayama | B60L 15/025 318/773 |
| 9,762,163 B2 | * | 9/2017 | Seok | H02P 21/18 |
| 10,312,846 B2 | * | 6/2019 | Hidaka | H02K 3/12 |

* cited by examiner

*Primary Examiner* — Thai T Dinh
(74) *Attorney, Agent, or Firm* — Oliff PLC

(57) ABSTRACT

A control device for a pole-number switching electric motor applied to a system including an electric motor capable of switching a number of poles, and an inverter electrically connected to stator windings of the electric motor; includes: a basic operation unit configured to operate the inverter to control a current amplitude which is magnitude of a current vector flowing in the stator winding, and a switching operation unit configured to operate the inverter to reduce the current amplitude before switching and increase the current amplitude after switching. The switching operation unit, the pole number switching period, operates the inverter so that a total value of the current amplitude before switching and the current amplitude after switching does not exceed a limiting current value.

10 Claims, 20 Drawing Sheets

<COMPARATIVE EXAMPLE 1>

I4*+I8*

<COMPARATIVE EXAMPLE 1>

I4*、I8*

<COMPARATIVE EXAMPLE 1>

Id4r、Iq4r

<COMPARATIVE EXAMPLE 1>

Id8r、Iq8r

<COMPARATIVE EXAMPLE 1>

TORQUE

<COMPARATIVE EXAMPLE 2>

I4✻+I8✻

<COMPARATIVE EXAMPLE 2>

I4✻、I8✻

<COMPARATIVE EXAMPLE 2>

Id4r、Iq4r

<COMPARATIVE EXAMPLE 2>

Id8r、Iq8r

<COMPARATIVE EXAMPLE 2>

TORQUE

CURRENT AMPLITUDE

PHASE CURRENT PEAK VALUE

SECONDARY MAGNETIC FLUX

TORQUE

TORQUE CHANGE RATE

14✻+18✻

14✻、18✻

Id4r、Iq4r

Id8r、Iq8r

TORQUE

TORQUE
CHANGE RATE

Time

CONTROL DEVICE FOR POLE-NUMBER SWITCHING ELECTRIC MOTOR

CROSS-REFERENCE TO RELATED APPLICATION

The present application is based on and claims the benefit of priority from Japanese Patent Application No. 2018-027297 filed on Feb. 19, 2018, the contents of which are hereby incorporated by reference.

BACKGROUND

Technical Field

The present disclosure relates to a control device of a pole-number switching electric motor.

Description of the Related Art

A control device of a pole-number switching electric motor is known. This kind of control devices includes a control device capable of suppressing torque shock of an electric motor at the time of switching the number of poles.

SUMMARY

The present disclosure provides a control device for a pole-number switching electric motor that is able to suppress an increase in the peak value of the current flowing in the stator windings.

As a first disclosure, a control device for a pole-number switching electric motor applied to a system including an electric motor capable of switching a number of poles, and an inverter electrically connected to stator windings of the electric motor; includes: a basic operation unit configured to operate the inverter to control a current amplitude which is magnitude of a current vector flowing in the stator winding, and a switching operation unit configured to operate the inverter to reduce the current amplitude before switching and increase the current amplitude after switching.

BRIEF DESCRIPTION OF THE DRAWINGS

The objects described above and other objects, features and advantages of the present disclosure will become more apparent by the following detailed description with reference to the accompanying drawings.

In the accompanying drawings.

DETAILED DESCRIPTION OF THE PREFERRED EMBODIMENTS

As a conventional control device, for example, JP H08-223999 discloses a control device capable of suppressing torque shock of an electric motor at the time of switching the number of poles. More specifically, for example, at the time of switching from 8 poles to 4 poles, this control device keeps the total torque of the torque corresponding to 8 poles and the torque corresponding to 4 poles constant, and together with gradually decreasing the torque corresponding to 8 poles, gradually increases the torque corresponding to 4 poles.

Even in a case of using the control method described in the above-mentioned patent literature, there is a problem in that the peak value of the voltage generated by the electric motor at the time of switching the number of poles may become large, and the peak value of the current flowing through the stator windings of the electric motor may become large.

First Embodiment

Hereinafter, a first embodiment in which a control device according to the present disclosure is applied to a vehicle such as an electric vehicle, a hybrid vehicle or the like including an electric motor as the main in-vehicle engine will be described with reference to the drawings.

Figure 1:
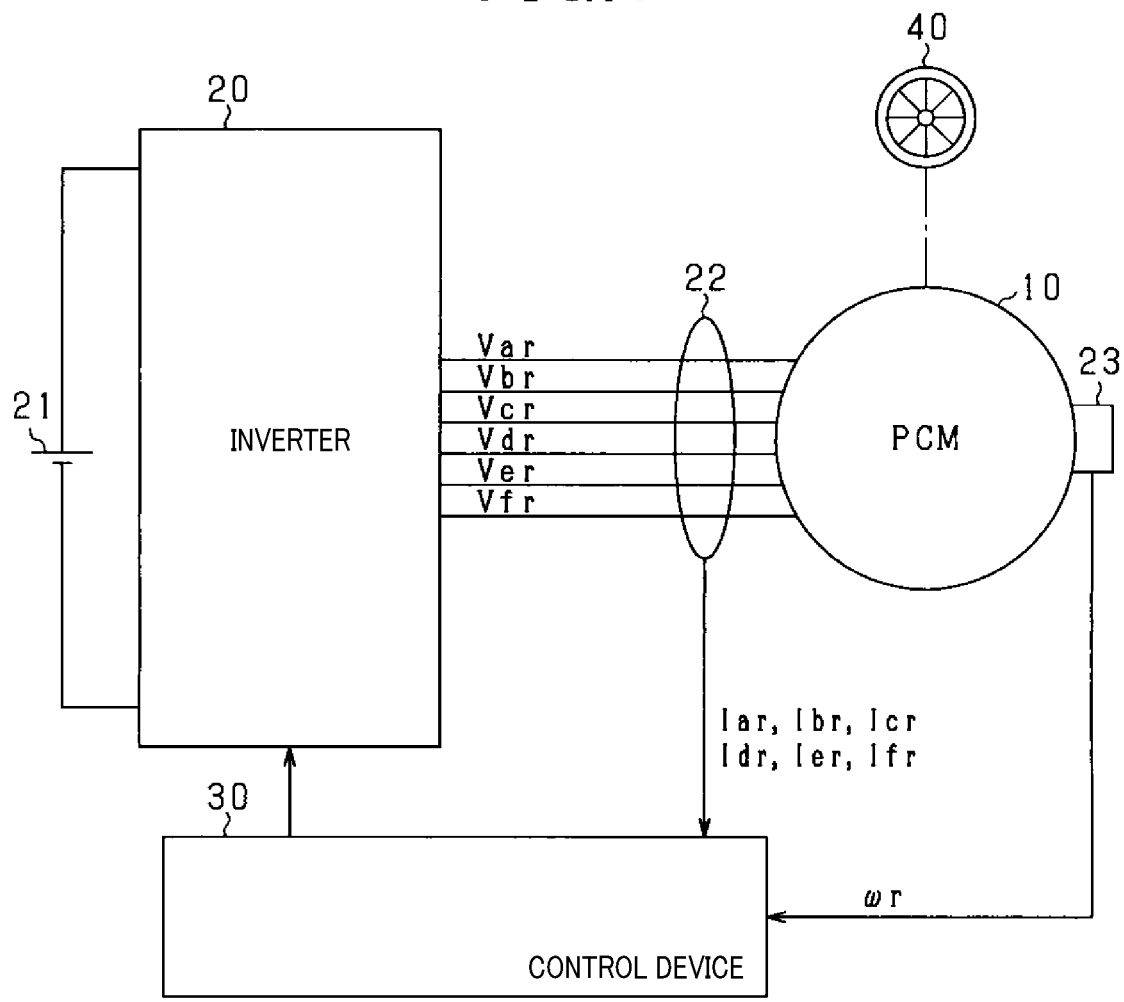
FIG. 1 is an overall configuration diagram of an in-vehicle motor control system according to a first embodiment.

As illustrated in FIG. 1, the in-vehicle control system includes a motor 10, an inverter 20, and a control device 30.

The motor 10 is a main in-vehicle engine and is capable of transmitting power to the drive wheels 40. In the present embodiment, the motor 10 is a squirrel-cage induction motor having a switchable number of poles, and more specifically, the number of poles is switchable between 4 poles and 8 poles. Note that an induction electric motor having a switchable number of poles is also called pole changing motor.

In a case where A is an even number of 2 or more and n is an integer of 2 or more, one of A poles and n×A poles is defined as the number of poles before switching, and the other is defined as the number of poles after switching. In a case where m is an integer of 3 or more, the motor 10 has n sets of m-phase stator windings 12A to 12F. In this case, the inverter 20 is an n×m phase inverter. In this embodiment, A=2, m=3, and n=2.

Figure 2:
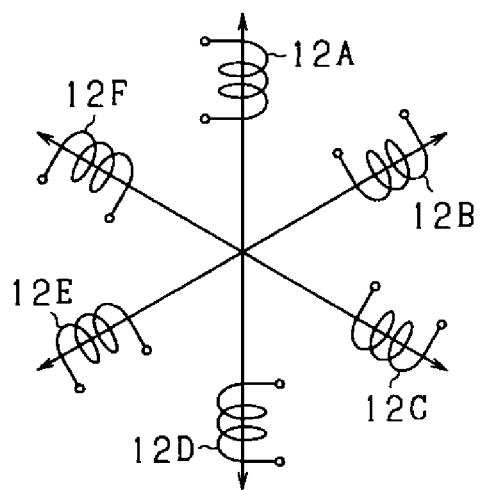
FIG. 2 is a diagram illustrating stator windings.

As illustrated in FIG. 2, the stator of the motor 10 includes 6-phase stator windings 12A to 12F. These stator windings 12A to 12F are provided on the stator so as to be shifted from each other by an electrical angle of 60 degrees.

Returning to the description of FIG. 1 above, the motor 10 is connected to a battery 21 as a DC power source via a six-phase inverter 20. The inverter 20 includes a serial connection body of upper and lower arm switches. Each switch of the inverter 20 is, for example, a voltage-controlled semiconductor switching element such as an IGBT, an N-channel MOSFET, or the like.

The control system includes a current sensor 22 and a speed sensor 23. The current sensor 22 detects each phase current flowing in the motor 10. In FIG. 1, detected values of currents flowing in the A, B, C, D, E, and F phase stator windings 12A, 12B, 12C, 12D, 12E, and 12F are indicated as Iar, Ibr, Icr, Idr, Ier, and Ifr. The speed sensor 23 detects the mechanical angular frequency ωr of the rotor of the motor 10. The detected values of the current sensor 22 and the speed sensor 23 are inputted to the control device 30.

The control device 30 includes a microcomputer and a main component, and operates the inverter 20 in order to perform feedback control of the torque of the motor 10 to the total command torque Tr*. The total command torque Tr* is outputted to the control device 30 from a higher order control device than the control device 30, such as a control device or the like that oversees traveling control of the vehicle.

Figure 3:
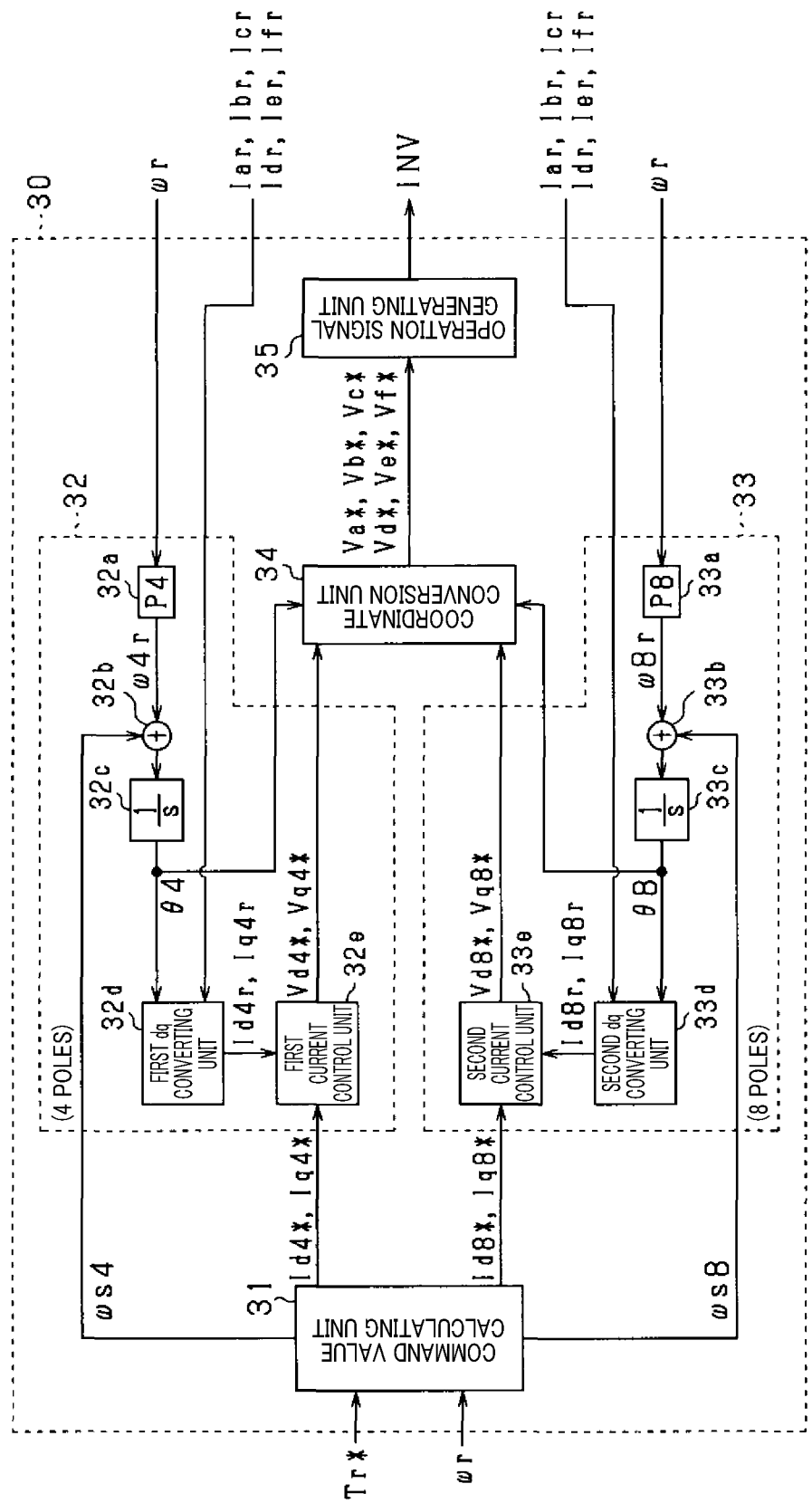
FIG. 3 is a block diagram illustrating vector control performed by a control device.

The torque control of the motor 10 performed by the control device 30 will be described with reference to FIG. 3.

The control device 30 includes a command value calculating unit 31, a 4-pole control unit 32, an 8-pole control unit 33, and a coordinate conversion unit 34.

The command value calculating unit 31, based on the acquired total command torque Tr* and the mechanical angular frequency ωr, calculates a first d-axis command current Id4*, a first q-axis command current Iq4*, a second d-axis command current Id8*, a second q-axis command current Iq8*, a first slip angular frequency ωs4 as a slip angular frequency corresponding to 4 poles, and a second slip angular frequency ωs8 as a slip angular frequency corresponding to 8 poles. The command value calculating unit 31 calculates the first d-axis command current Id4*, the first q-axis command current Iq4*, the second d-axis command current Id8*, and the second q-axis command current Iq8* so that the added value of the torque of the motor 10 corresponding to 4 poles determined from the first d-axis command current Id4* and the first q-axis command current Iq4* and the torque of the motor 10 corresponding to 8 poles determined from the second d-axis command current Id8* and the second q-axis command current Iq8* becomes the total command torque Tr*.

The 4-pole control unit 32 is a current control system of the motor 10 when 4 poles is selected as the number of poles of the motor 10. The 8-pole control unit 33 is a current control system of the motor 10 when 8 poles is selected as the number of poles of the motor 10.

First, the 4-pole control unit 32 will be described. A first frequency calculating unit 32a, based on the mechanical angular frequency ωr and the number of poles P4 in a case of 4 poles, calculates a first electrical angular frequency ω4r as the electrical angular frequency of the motor 10 corresponding to 4 poles.

A first adding unit 32b adds the first slip angular frequency ωs4 calculated by the command value calculating unit 31 to the first electrical angular frequency ω4r calculated by the first frequency calculating unit 32a, and outputs the result.

A first angle calculating unit 32c calculates a first electrical angle θ4 by integrating the output value of the first adding unit 32b.

A first dq converting unit 32d, based on the first electrical angle θ4 calculated by the first angle calculating unit 32c, converts the phase currents Iar to Ifr detected by the current sensor 22 into a first d-axis current Id4r and a first q-axis current Iq4r on the dq axes corresponding to the 4 poles. Here, the d-axis current is an excitation current for generating a secondary magnetic flux, and the q-axis current is a torque current. Moreover, the dq coordinate system corresponding to the 4 poles is an orthogonal two-dimensional rotational coordinate system that rotates at a primary angular frequency that is the rotational angular frequency of the output voltage vector of the inverter 20.

A first current control unit 32e, using the first d-axis current Id4r converted by the first dq converting unit 32d as an operation amount for performing feedback control of the first d-axis command current Id4* calculated by the command value calculating unit 31, calculates a first d-axis command voltage Vd4* on the d-axis. Moreover, the first current control unit 32e, using the first q-axis current Iq4r converted by the first dq converting unit 32d as an operation amount for performing feedback control of the first q-axis command current Iq4* calculated by the command value calculating unit 31, calculates a first q-axis command voltage Vq4* on the q-axis. Note that the feedback control used by the first current control unit 32e may be, for example, proportional-plus-integral control.

Next, the 8-pole control unit 33 will be described. A second frequency calculating unit 33a, based on the mechanical angular frequency ωr and the number of poles P8 in a case of 8 poles, calculates a second electrical angular frequency ω8r as the electrical angular frequency of the motor 10 corresponding to 8 poles.

A second adding unit 33b adds the second slip angular frequency ωs8 calculated by the command value calculating unit 31 to the second electrical angular frequency ω8r calculated by the second frequency calculating unit 33a, and outputs the result.

A second angle calculating unit 33c calculates a second electrical angle θ8 by integrating the output value of the second adding unit 33b.

A second dq converting unit 33d, based on the second electrical angle θ8 calculated by the second angle calculating unit 33c, converts the phase currents Iar to Ifr detected by the current sensor 22 into a second d-axis current Id8r and a second q-axis current Iq8r on the dq axes corresponding to the 8 poles. The dq coordinate system corresponding to 8 poles is an orthogonal two-dimensional rotating coordinate system that rotates at a primary angular frequency corresponding to 8 poles.

A second current control unit 33e, using the second d-axis current Id8r converted by the second dq converting unit 33d as an operation amount for performing feedback control of the second d-axis command current Id8* calculated by the command value calculating unit 31, calculates a second d-axis command voltage Vd8* on the d-axis. Moreover, the second current control unit 33e, using the second q-axis current Iq8r converted by the second dq converting unit 33d as an operation amount for performing feedback control of the second q-axis command current Iq8* calculated by the command value calculating unit 31, calculates a second q-axis command voltage Vq8* on the q-axis. Note that the feedback control used by the second current control unit 33e may be, for example, proportional-plus-integral control.

The coordinate conversion unit 34, based on the first d and q command voltages Vd4*, Vq4* and the first electrical angle θ4 calculated by the first current control unit 32e, and the second d and q command voltages Vd8*, Vq8* and the second electrical angle θ8 calculated by the second current control unit 33e, calculates A, B, C, D, E, and F phase command voltages Va*, Vb*, Vc*, Vd*, Ve*, and Vf* in a 6-phase fixed coordinate system.

Incidentally, in a case where 4 poles are selected as the number of poles of the motor 10, the phase command voltages Va* to VP calculated by the coordinate conversion unit 34 have waveforms that are shifted by 60 degrees each in the order of the A, B, C, D, E and F phases, as in the equation below (Eq1). In the following equation (Eq1), Vm4 represents the amplitude of the command voltage, t represents time, ω4c represents the primary angular frequency, and σ4 represents the phase of the command voltage.

$$\begin{aligned} V_a^* &= V_{a4}^* = V_{m4}\,\cos(\omega_{4c}t + \sigma_4) \\ V_b^* &= V_{b4}^* = V_{m4}\,\cos(\omega_{4c}t + \sigma_4 - \pi/3) \\ V_c^* &= V_{c4}^* = V_{m4}\,\cos(\omega_{4c}t + \sigma_4 - 2\pi/3) \\ V_d^* &= V_{d4}^* = V_{m4}\,\cos(\omega_{4c}t + \sigma_4 - \pi) \\ V_e^* &= V_{e4}^* = V_{m4}\,\cos(\omega_{4c}t + \sigma_4 - 4\pi/3) \\ V_f^* &= V_{f4}^* = V_{m4}\,\cos(\omega_{4c}t + \sigma_4 - 5\pi/3) \end{aligned} \quad \text{(eq1)}$$

On the other hand, in a case where 8 poles are selected as the number of poles of the motor 10, the phase command voltages Va* to Vf* calculated by the coordinate conversion unit 34 have waveforms that are shifted by 120 degrees each in the order of the A, B, C, D. E and F phases, as in the equation below (Eq2). In the following equation (Eq2), Vm8 represents the amplitude of the command voltage, ω8c represents the primary angular frequency, and σ8 represents the phase of the command voltage.

$$\begin{aligned} V_a^* &= V_{a8}^* = V_{m8}\,\cos(\omega_{8c}t + \sigma_8) \\ V_b^* &= V_{b8}^* = V_{m8}\,\cos(\omega_{8c}t + \sigma_8 - 2\pi/3) \\ V_c^* &= V_{c8}^* = V_{m8}\,\cos(\omega_{8c}t + \sigma_8 - 4\pi/3) \\ V_d^* &= V_{d8}^* = V_{m8}\,\cos(\omega_{8c}t + \sigma_8) \\ V_e^* &= V_{e8}^* = V_{m8}\,\cos(\omega_{8c}t + \sigma_8 - 2\pi/3) \\ V_f^* &= V_{f8}^* = V_{m8}\,\cos(\omega_{8c}t + \sigma_8 - 4\pi/3) \end{aligned} \quad \text{(eq2)}$$

Figure 4:
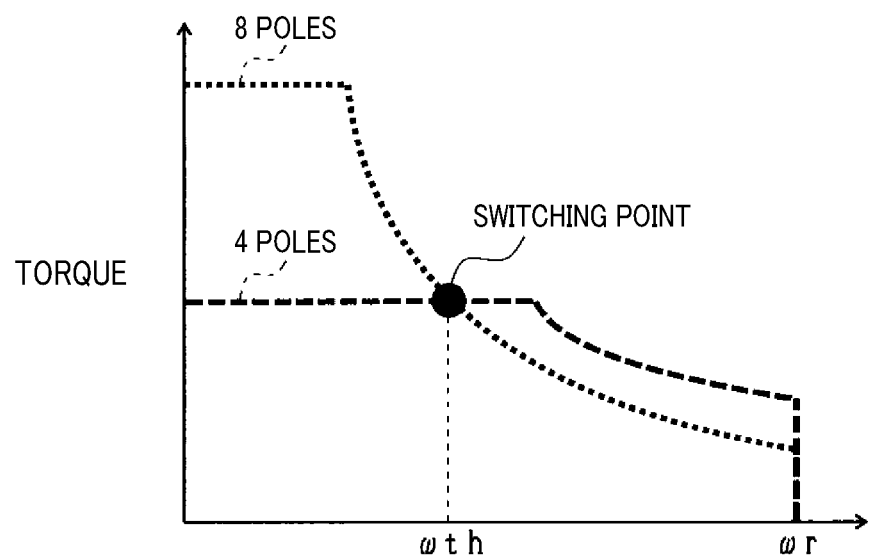
FIG. 4 is a diagram illustrating a pole number switching point.

In a case where it is determined that the mechanical angular frequency cur of the motor 10 is equal to or less than a threshold speed ωth, the command value calculating unit 31 selects 8 poles as the number of poles of the motor 10, and in a case where the mechanical angular frequency cur exceeds the threshold speed ωth, the command value calculating unit 31 selects 4 poles as the number of poles of the motor 10. In the present embodiment, as illustrated in FIG. 4, the threshold speed ωth is set within a range of the mechanical angular frequency ωr that can be obtained when the torque of the motor 10 corresponding to 4 poles is a maximum value.

An operation signal generating unit 35 generates operation signals for setting the voltages to be applied from the inverter 20 to the stator windings 12A, 12B, 12C, 12D, 12E, 12F as the respective phase command voltages Va*, Vb*, Vc*, Vd*, Ve*, Vf*, and outputs the generated operation signals to each of the switches of the inverter 20. The operation signal generating unit 35 may, for example, generate the operation signals by PWM control based on the magnitude comparison of each phase command voltage and a carrier signal such as a triangular wave signal or the like. In the present embodiment, the 4-pole control unit 32, the 8-pole control unit 33, the coordinate conversion unit 34, and the operation signal generating unit 35 correspond to a basic operation unit and a switching operation unit.

Incidentally, in a case where 4 poles are selected as the number of poles of the motor 10 by the control described above, the phase currents Ia4, Ib4, Ic4, Id4, Ie4, If4 given in the following equation (Eq3) flow in the respective the stator windings 12A, 12B, 12C, 12D, 12E, 12F of each phase. In the following equation (Eq3), Im4 represents the amplitude of the phase current, and α4 represents the phase of the phase current.

$$\begin{aligned} I_{a4} &= I_{m4}\,\cos(\omega_{4c}t + \alpha_4) \\ I_{b4} &= I_{m4}\,\cos(\omega_{4c}t + \alpha_4 - \pi/3) \\ I_{c4} &= I_{m4}\,\cos(\omega_{4c}t + \alpha_4 - 2\pi/3) \\ I_{d4} &= I_{m4}\,\cos(\omega_{4c}t + \alpha_4 - \pi) \\ I_{e4} &= I_{m4}\,\cos(\omega_{4c}t + \alpha_4 - 4\pi/3) \\ I_{f4} &= I_{m4}\,\cos(\omega_{4c}t + \alpha_4 - 5\pi/3) \end{aligned} \quad \text{(eq3)}$$

On the other hand, in a case where 8 poles are selected as the number of poles of the motor 10, the phase currents Ia8, Ib8, Ic8, Id8, Ie8, If8 given in the following equation (Eq4) flow in the respective the stator windings 12A, 12B, 12C, 12D, 12E, 12F of each phase. In the following equation (Eq4), Im8 represents the amplitude of the phase current, and α8 represents the phase of the phase current.

$$\begin{aligned} I_{a8} &= I_{m8}\,\cos(\omega_{8c}t + \alpha_8) \\ I_{b8} &= I_{m8}\,\cos(\omega_{8c}t + \alpha_8 - 2\pi/3) \\ I_{c8} &= I_{m8}\,\cos(\omega_{8c}t + \alpha_8 - 4\pi/3) \\ I_{d8} &= I_{m8}\,\cos(\omega_{8c}t + \alpha_8) \\ I_{e8} &= I_{m8}\,\cos(\omega_{8c}t + \alpha_8 - 2\pi/3) \\ I_{f8} &= I_{m8}\,\cos(\omega_{8c}t + \alpha_8 - 4\pi/3) \end{aligned} \quad \text{(eq4)}$$

The command value calculating unit 31 performs a pole number switching process for switching the pole number of the motor 10 from one of 4 poles and 8 poles to the other during the pole number switching period. Hereinafter, the pole number switching process in a case of switching from 8 poles to 4 poles will be described with reference to FIGS. 5A to 5E. In the example illustrated in FIGS. 5A to 5E, 8 poles correspond to the number of poles before switching, and 4 poles correspond to the number of poles after switching.

Figure 5A:
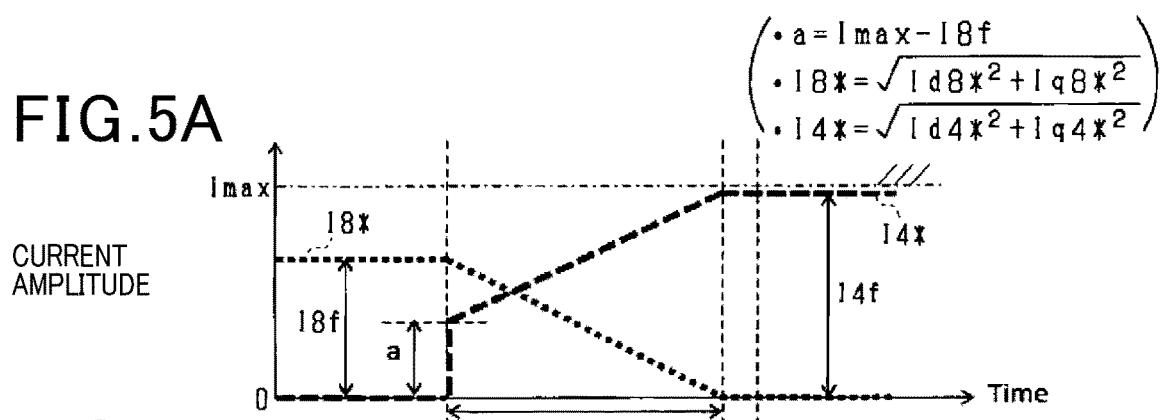
FIGS. 5A to 5E are timing diagrams illustrating a pole number switching mode.

FIG. 5A illustrates the transition in the 8-pole command amplitude I8* and the 4-pole command amplitude I4*. The 4-pole command amplitude I4* is a square root of a value obtained by adding the squared value of the first d-axis command current Id4* and the squared value of the first q-axis command current Iq4*. The 8-pole command amplitude I8* is a square root of a value obtained by adding the squared value of the second d-axis command current Id8* and the squared value of the second q-axis command current Iq8*. In FIGS. 5A to 5E, the 8-pole command amplitude I8* corresponds to the command amplitude before switching, and the 4-pole command amplitude I4* corresponds to the command amplitude after switching. In addition, hereinafter, the square root of the value obtained by adding the squared value of the first d-axis current Id4r and the squared value of the first q-axis current Iq4r is referred to as the 4-pole current amplitude, and the square root of the value obtained by adding the squared value of the second d-axis current Id8r and the squared value of the second q-axis current Iq8r is referred to as the 8-pole current amplitude.

Figure 5B:
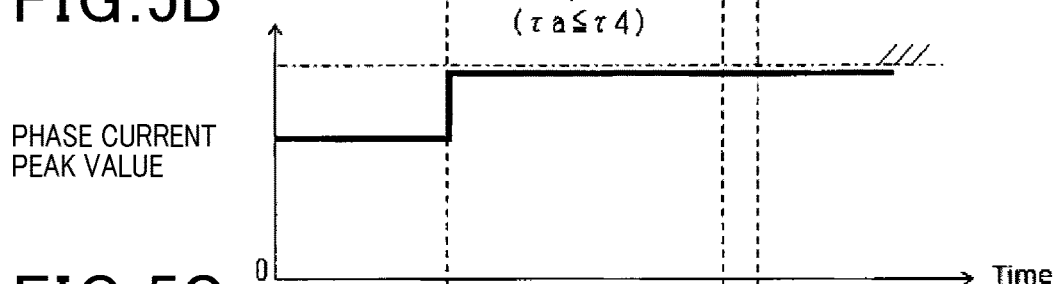
Figure 5C:
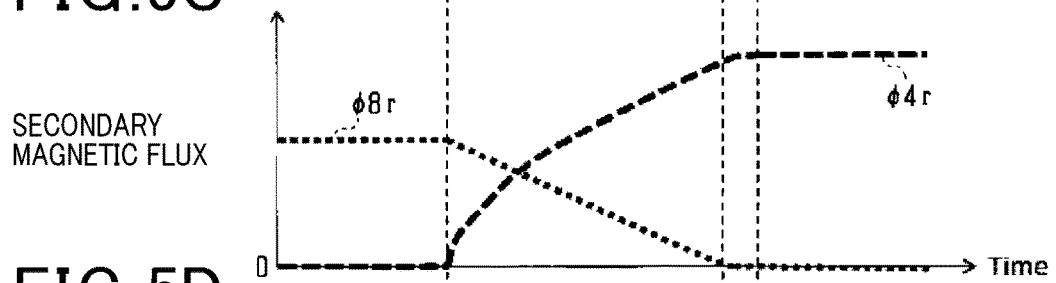

FIG. 5B illustrates the transition of the peak value of the phase current flowing in the stator windings of each phase, and FIG. 5C illustrates the transition of the 4-pole secondary magnetic flux φ4r and the 8-pole secondary magnetic flux φ8r. The 4-pole secondary magnetic flux φ4r is a d-axis component of the secondary magnetic flux vector of the motor 10 corresponding to the 4 poles. The 8-pole secondary magnetic flux φ8r is a d-axis component of the secondary magnetic flux vector of the motor 10 corresponding to the 8 poles.

Figure 5D:
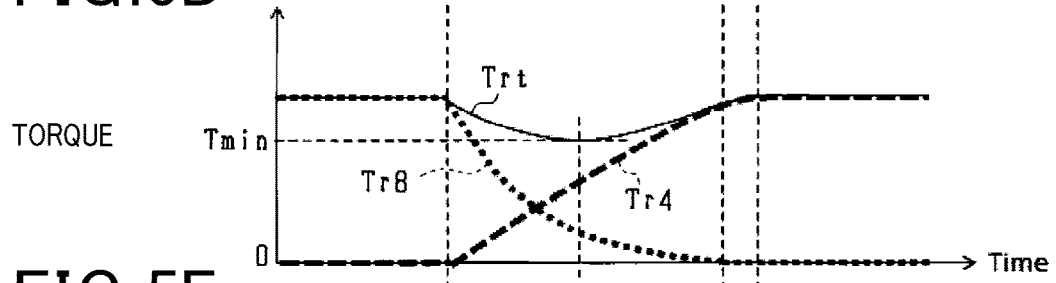

FIG. 5D shows the transition in the 4-pole torque Tr4, 8-pole torque Tr8, and total torque Trt. The 4-pole torque Tr4 is the torque of the motor 10 corresponding to 4 poles, and the 8-pole torque Tr8 is the torque of the motor 10 corresponding to 8 poles. The total torque Trt is the total value of the 4-pole torque Tr4 and the 8-pole torque Tr8.

Figure 5E:
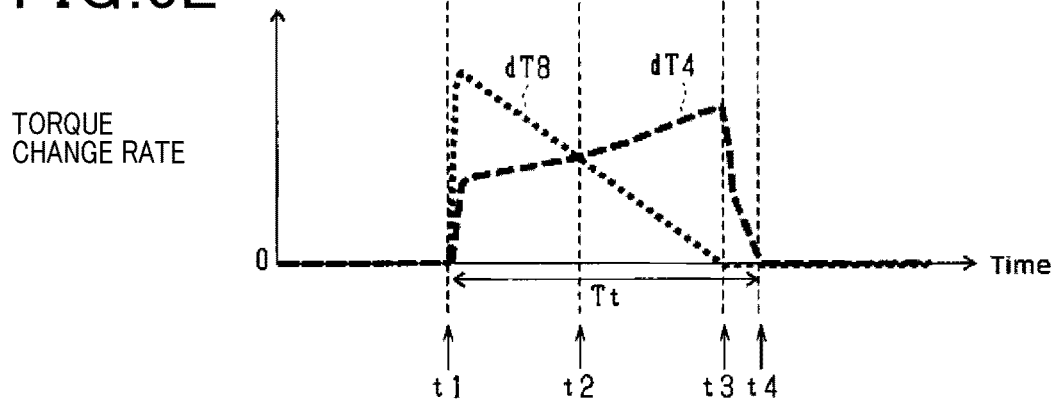

FIG. 5E illustrates the transition in the 4-pole torque change rate dT4 and the 8-pole torque change rate dT8. The 4-pole torque change rate dT4 is the absolute value of the time derivative of the 4-pole torque Tr4, and the 8-pole torque change rate dT8 is the absolute value of the time derivative of the 8-pole torque Tr8.

In FIGS. 5A to 5E, the times t1 to t3 indicate the pole number switching period TC. The command amplitude before switching determined from the d and q axis command currents at the start timing t1 of the pole number switching period TC is referred to as the initial value before switching, and the command amplitude after switching determined from the d and q axis command currents at the end timing of the pole number switching period TC is referred to as the initial value after switching. In a case of switching from 8 poles to 4 poles, the initial value before switching is the 8-pole initial value before switching I8f, and the initial value after switching is the 4-pole initial value after switching I4f. On the other hand, in a case of switching from 4 poles to 8 poles, the initial value before switching is the 4-pole initial value before switching I4f, and the initial value after switching is the 8-pole initial value after switching I8f.

In the example illustrated in FIGS. 5A to 5E, the command value calculating unit 31 maintains the 8-pole command amplitude I8* at a certain value and sets the 4-pole command amplitude I4* to 0 before time t1.

The command value calculating unit 31 calculates the 8-pole command amplitude I8* and the 4-pole command amplitude I4* so that during the pole number switching period TC from time t1 to time t3, the total command amplitude that is the total value of 8-pole command amplitude I8* and 4-pole command amplitude I4* becomes equal to or less than the limiting current value Imax. This makes it possible to prevent the peak value of the phase current flowing through the stator windings 12A to 12F of each phase from becoming excessively large during the pole number switching period TC.

The limiting current value Imax is, for example, a value set to protect the motor 10 from overcurrent. The limiting current value Imax is the larger of the limiting current value corresponding to the number of poles before switching and the limiting current value corresponding to the number of poles after switching. In the present embodiment, the limiting current value corresponding to the number of poles before switching and the limiting current value corresponding to the number of poles after switching have the same value.

At the start timing t1 of the pole number switching period TC, the command value calculating unit 31 starts decreasing the 8-pole command amplitude I8* from the 8-pole initial value before switching I8f and increases the 4-pole command amplitude I4* from 0 toward the rising current value a in a stepwise manner. In the present embodiment, the rising current value a is the same value as the current margin value that is a value obtained by subtracting the 8-pole initial value before switching I8f from the limiting current value Imax. The command value calculating unit 31 increases the 4-pole command amplitude I4* in a stepwise manner, and then linearly increases the 4-pole command amplitude I4* toward the 4-pole initial value after switching I4f, and at the end timing t3 of the pole number switching period TC, sets the 4-pole command amplitude I4* to the 4-pole initial value after switching I4f. By increasing the rising current value a in a stepwise manner at the start timing of the pole number switching period TC, the 4-pole secondary magnetic flux φ4r is rapidly increased while keeping the total command amplitude equal to or less than the limiting current value Imax. As a result, the 4-pole torque Tr4 may be rapidly increased, and a decrease in the total torque Trt with respect to the total command torque Tr* may be suppressed during the pole number switching period TC.

Moreover, the command value calculating unit 31 linearly decreases the 8-pole command amplitude I8* toward 0, and sets the 8-pole command amplitude I8* to 0 at the end timing t3 of the pole number switching period TC. Note that time t4 is the timing at which the 4-pole torque Tr4 becomes a torque corresponding to the 4-pole initial value after switching I4f, and the 8-pole torque Tr8 becomes 0. In FIGS. 5A to 5E, the times t1 to t4 are represented as the torque change period Tt.

Each phase command voltage Va* to VP in the pole number switching period TC is an added value of the phase voltages given in the above equations (Eq1) and (Eq2). Moreover, the phase currents flowing in the stator windings 12A, 12B, 12C, 12D, 12E, 12F of the respective phases in the pole number switching period TC are the added values of the phase currents given in the above equations (Eq3) and (Eq4).

Figure 6A:
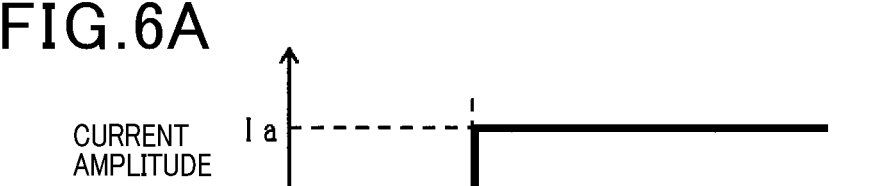
FIGS. 6A to 6E are timing diagrams illustrating transition in current amplitude and the like when switching the number of poles.
Figure 6B:
Figure 6C:
Figure 6D:
Figure 6E:
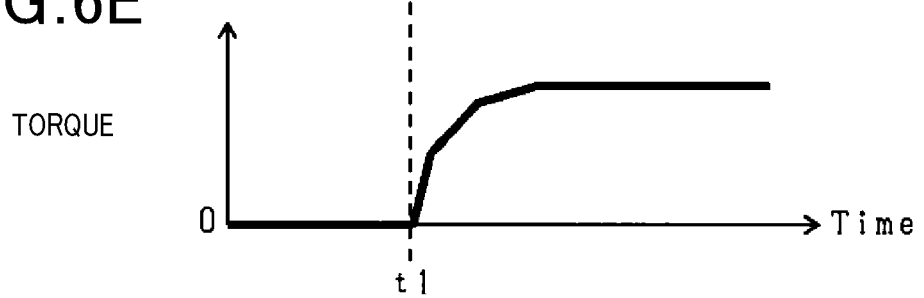

Next, the operating point where convergence occurs after switching the number of poles will be described with reference to FIGS. 6A to 6E, and FIG. 7. 6A illustrates the transition of the current amplitude; FIG. 6B illustrates the transition of the d-axis current Id; FIG. 6C illustrates the transition of the secondary magnetic flux φd, and FIG. 6D illustrates the transition of the shaft current Iq; and FIG. 6E illustrates the transition of the torque of the motor 10.

The slip frequency fs of the motor 10 is expressed by the following equation (Eq5). In the following equation (Eq5), M represents a mutual inductance between the rotor winding and the stator windings, Rr represents a secondary resistance that is the resistance of the rotor winding, and Lr represents a secondary inductance that is the self-inductance of the rotor winding.

$$f_s = \frac{1}{2\pi} \frac{M \cdot R_r}{L_r} \frac{I_q}{\phi_d} \quad (eq5)$$

By modifying the above equation (Eq5), the following equation (Eq6) is derived.

$$I_q = \frac{2\pi \cdot f_s \cdot L_r}{M \cdot R_r} \phi_d \quad (eq6)$$

At time t1 in FIG. 6, the secondary magnetic flux φd on the d-axis is 0. In a case where the current amplitude is changed in a stepwise manner from 0 to Ia at time t1 while keeping the slip frequency fs constant, the relationship given in the following equation (Eq7) is derived based on the above equation (Eq6).

$$\left. \begin{array}{l} I_q = 0 \\ I_d = \sqrt{I_a^2 - I_q^2} = I_a \end{array} \right\} \quad (eq7)$$

Figure 7:
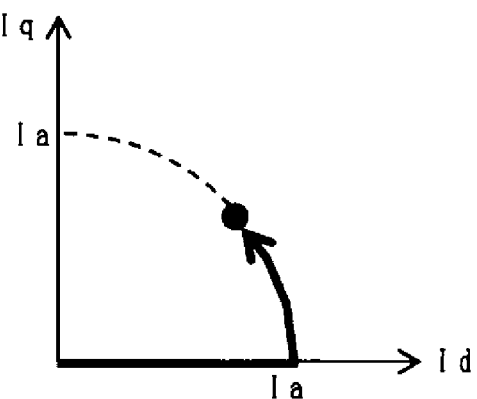
FIG. 7 is a diagram illustrating an operating point where convergence occurs after switching the number of poles.

According to the equation above (Eq7), when the current amplitude increases in a stepwise manner, the d-axis current Id increases in a stepwise manner. In a case where fs≠0, after the d-axis current Id changes in a stepwise manner, the q-axis current Iq increases according to the equation above (Eq6). When the q-axis current Iq increases, the d-axis current Id decreases due to the relationship of Id=√(Ia^2−Id^2). Therefore, as illustrated in FIGS. 6B, 6D, and FIG. 7, the operating point determined by the d, q-axis currents Id, Iq converges to the operating point determined by the slip frequency fs and the current amplitude Ia. By changing the current amplitude in a stepwise manner, the speed of increase of the secondary magnetic flux φd may be increased, and the torque response of the motor 10 at the time of switching the number of poles may be improved.

Figure 8:
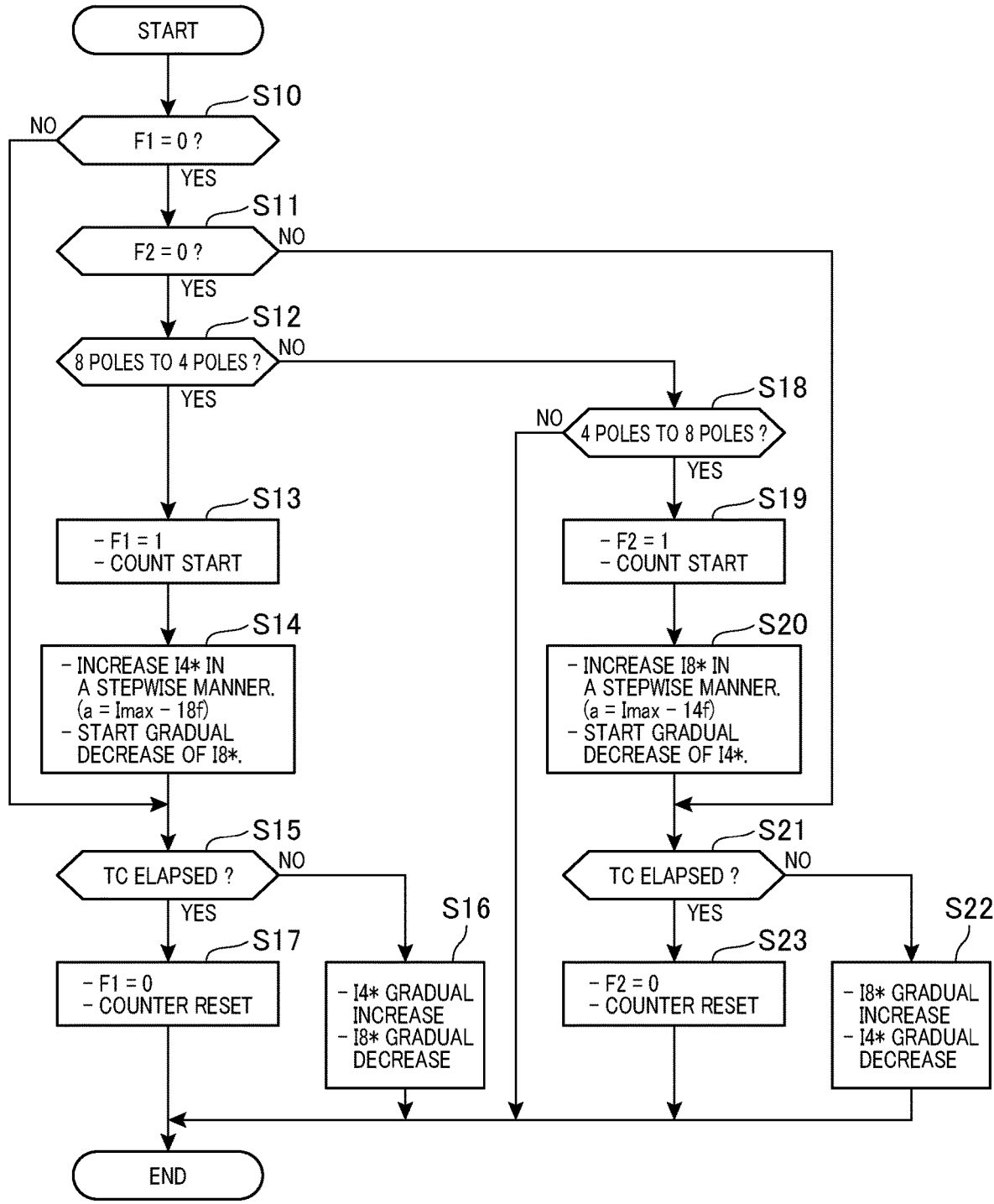
FIG. 8 is a flowchart illustrating a procedure of a pole number switching process.

FIG. 8 illustrates the procedure of the pole number switching process according to the present embodiment. This process is repeatedly executed by the command value calculating unit 31, for example, before a predetermined control cycle.

In step S10, it is determined whether a first flag F1 is 0. The first flag F1, when set to a value of 1, indicates that switching from 8 poles to 4 poles has been instructed, and when set to a value of 0, indicates that switching from 8 poles to 4 poles has not been instructed. In this embodiment, the initial value of the first flag F1 is 0.

In a case where it is determined in step S10 that the first flag F1 is 0, the process proceeds to step S11, and it is determined whether a second flag F2 is 0. The second flag F2, when set to a value of 1, indicates that switching from 4 poles to 8 poles has been instructed, and when set to a value of 0, indicates that switching from 4 poles to 8 poles has not been instructed. In this embodiment, the initial value of the second flag F2 is 0.

In a case where it is determined in step S11 that the second flag F2 is 0, the process proceeds to step S12, and it is determined whether switching from 8 poles to 4 poles is instructed. In a case where an affirmative decision is made in step S12, the process proceeds to step S13, and the first flag F1 is set to 1. Moreover, counting of the elapsed time after the instruction to switch from 8 poles to 4 poles starts.

In step S14, the 4-pole command amplitude I4* is increased in a stepwise manner from 0 to the rising current value a. In this case, the rising current value a is the same as the current margin value that is a value obtained by subtracting the 8-pole initial value before switching I8f from the limiting current value Imax. Moreover, the 8-pole command amplitude I8* starts to be reduced from the 8-pole initial value before switching I8f.

In a case where the process of step S14 is completed or in a case where it is determined that the first flag F1 is 1 in step S10, the process proceeds to step S15. In step S15, it is determined whether the elapsed time from the start of counting in step S13 has passed the pole number switching period TC.

In a case where it is determined in step S15 that the time has not passed the switching period TC, the process proceeds to step S16, and the 4-pole command amplitude I4* is gradually increased toward the 4-pole initial value after switching I4f. Moreover, the 8-pole command amplitude I8* is gradually decreased toward 0. In the present embodiment, in the pole number switching period TC, the 4-pole command amplitude I4* is increased with the responsiveness of a time constant τa that is equal to or less than a secondary time constant τ4 of the motor 10 corresponding to the 4 poles. The secondary time constant is a time constant on the rotor side of the motor 10 and is a time constant of the primary delay element. The secondary time constant depends on the inductance and resistance of the rotor. The secondary time constant τ4 depends on the rotor temperature, and the pole number switching period TC may be variably set based on the detected value of the rotor temperature.

On the other hand, in a case where it is determined in step S15 that the pole number switching period TC has elapsed, the process proceeds to step S17, the first flag F1 is set to 0, and the counted elapsed time is reset to 0.

In a case where a negative determination is made in step S12, the process proceeds to step S18, and it is determined whether switching from 4 poles to 8 poles is instructed. In a case where an affirmative decision is made in step S18, the process proceeds to step S19, and the second flag F2 is set to 1. Moreover, counting of the elapsed time after the instruction to switch from 4 poles to 8 poles starts.

In step S20, the 8-pole command amplitude I8* is increased in a stepwise manner from 0 to the rising current value a. In this case, the rising current value a is a value obtained by subtracting the 4-pole initial value before switching I4f from the limiting current value Imax. Moreover, the 4-pole command amplitude I4* starts to be reduced from the 4-pole initial value before switching I4f.

In a case where the process of step S20 is completed or in a case where it is determined that the second flag F2 is 1 in step S11, the process proceeds to step S21. In step S21, it is determined whether the elapsed time from the start of counting in step S19 has passed the pole number switching period TC.

In a case where it is determined in step S21 that the time has not passed the pole number switching period TC, the process proceeds to step S22, and the 8-pole command amplitude I8* is gradually increased toward the 8-pole initial value after switching I8f. Moreover, the 4-pole command amplitude I4* is gradually decreased toward 0. In the present embodiment, in the pole number switching period TC, the 8-pole command amplitude I8* is increased with the responsiveness of a time constant that is equal to or less than a secondary time constant τ8 of the motor 10 corresponding to the 8 poles.

On the other hand, in a case where it is determined in step S21 that the pole number switching period TC has elapsed, the process proceeds to step S23, the second flag F2 is set to 0, and the counted elapsed time is reset to 0.

Figure 9A:
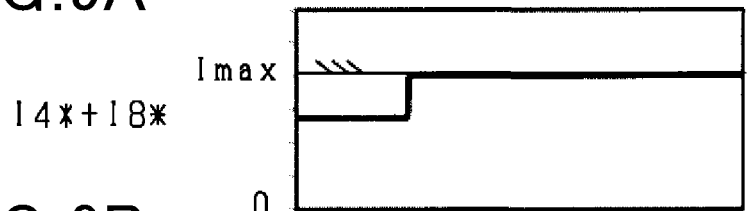
FIGS. 9A to 9F are timing diagrams illustrating a pole number switching mode.
Figure 9B:
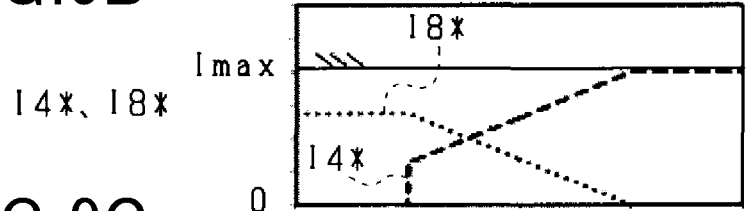
Figure 9C:
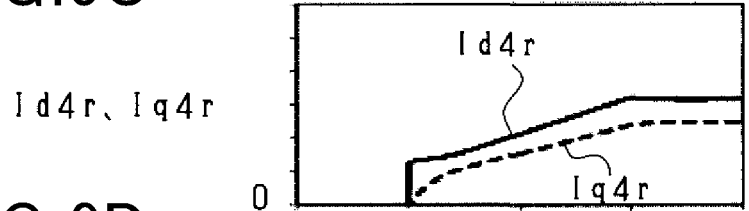
Figure 9D:
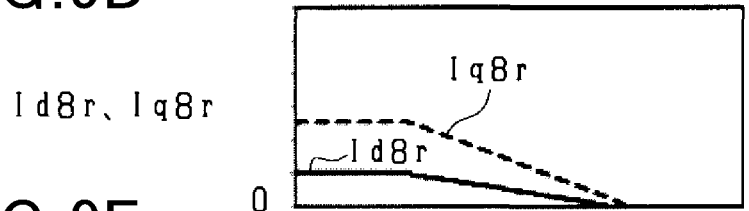
Figure 9E:
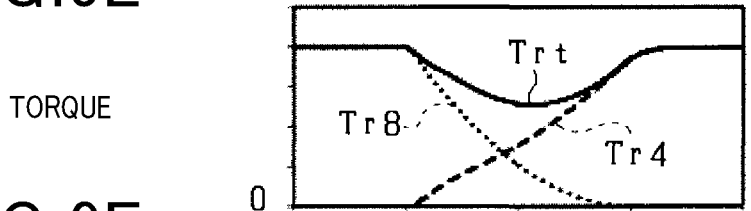
Figure 9F:
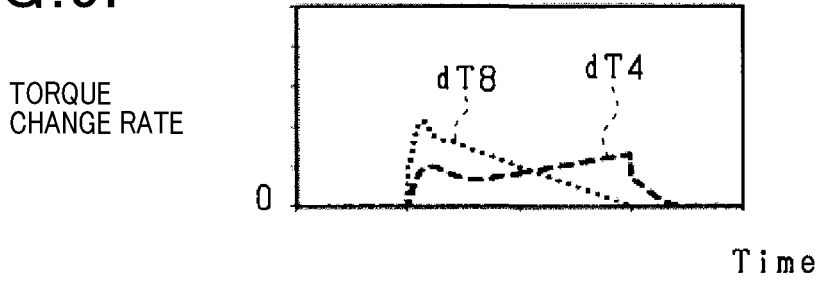
Figure 10A:
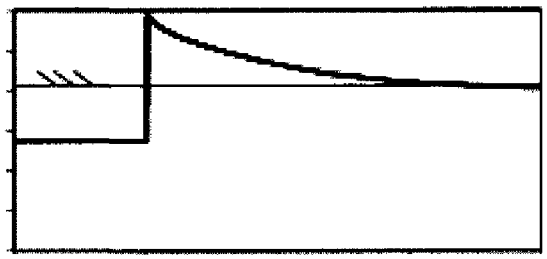
FIGS. 10A to 10E are timing diagrams illustrating a pole number switching mode according to a Comparative Example 1.
Figure 10B:
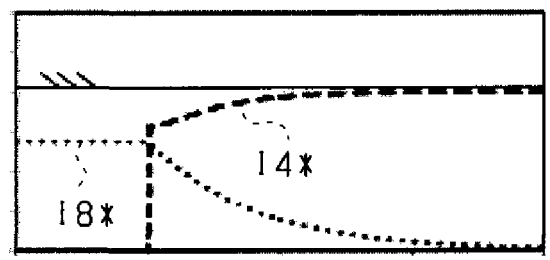
Figure 10C:
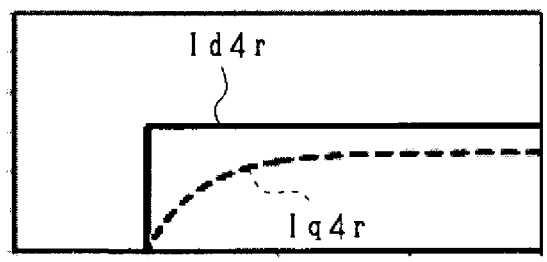
Figure 10D:
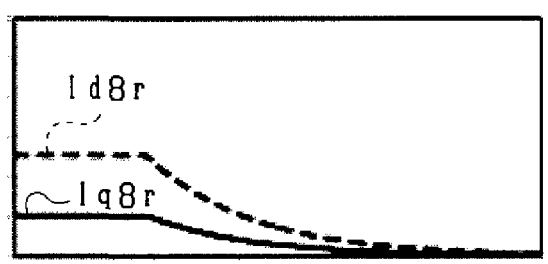
Figure 10E:
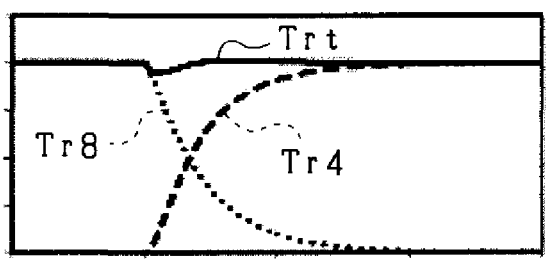
Figure 11A:
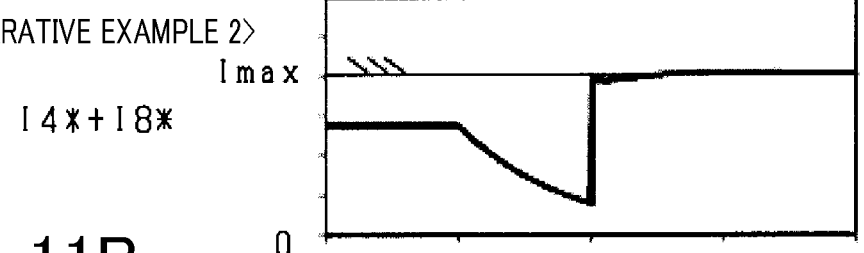
FIGS. 11A to 11E are timing diagrams illustrating a pole number switching mode according to a Comparative Example 2.
Figure 11B:
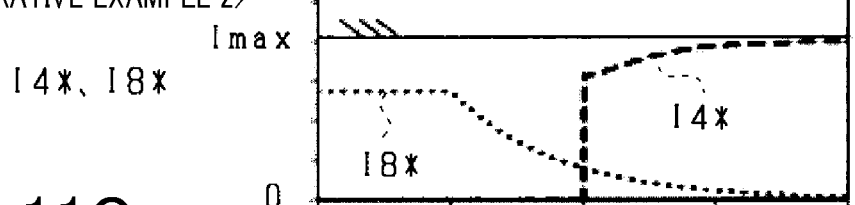
Figure 11C:
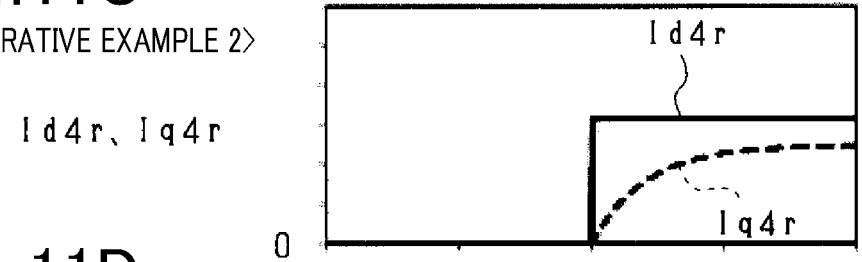
Figure 11D:
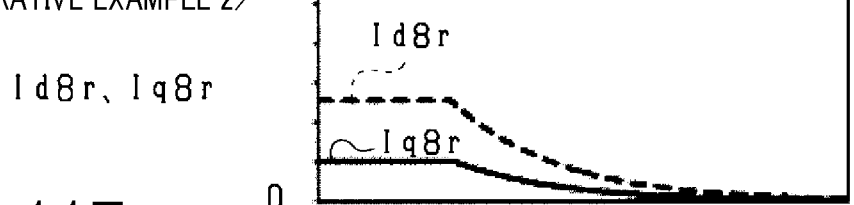
Figure 11E:
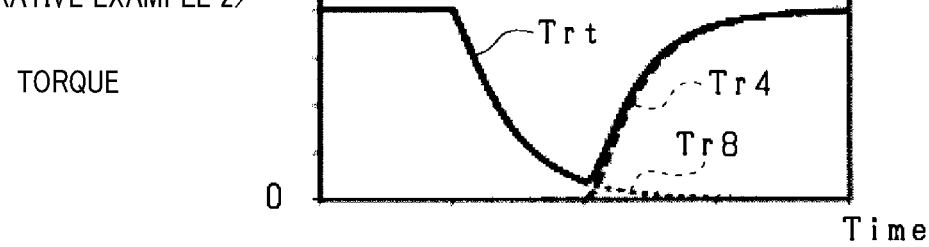

FIGS. 9A to 9F illustrate the transition of each parameter in a case of switching from 8 poles to 4 poles. FIG. 9A illustrates the transition of the total command amplitude that is the total value of the 4-pole command amplitude I4* and the 8-pole command amplitude I8*, and FIG. 9B illustrates the transition of the 4-pole command amplitude I4* and the 8-pole command amplitude I8*. FIG. 9C illustrates the transition of the first d-axis current Id4r and the first q-axis current Iq4r corresponding to 4 poles, and FIG. 9D illustrates the transition of the second d-axis current Id8r and the second q-axis current Iq8r corresponding to 8 poles. FIG. 9E illustrates the transition in the 4-pole torque Tr4, 8-pole torque Tr8, and total torque Trt of the motor 10, and FIG. 9F illustrates the transition in the 4-pole torque change rate dT4 and the 8-pole torque change rate dT8.

According to the present embodiment, the total command amplitude may be suppressed to be equal to or less than the limiting current value Imax in the pole number switching period TC. Therefore, it is possible to prevent the peak value of the phase current flowing in the stator windings from increasing during the pole number switching period TC.

In addition, for example, in the pole number switching period TC, in a case of switching from 8 poles to 4 poles, the 4-pole command amplitude I4* is increased with a responsiveness of a value equal to or less than a secondary time constant of the motor 10 corresponding to the pole number after switching. As a result, the 4-pole secondary magnetic flux may be rapidly increased, and the effect of suppressing a decrease in torque of the motor 10 during the pole number switching period TC may be improved.

Moreover, for example, at the start timing of the pole number switching period TC in a case of switching from 8 poles to 4 poles, the 4-pole command amplitude I4* is increased in a stepwise manner from 0 to just the rising current value a. As a result, the 4-pole secondary magnetic flux may be increased more quickly, and the effect of suppressing a decrease in the torque of the motor 10 during the pole number switching period TC may be further improved.

On the other hand, in Comparative Example 1 illustrated in FIGS. 10A to 10E and Comparative Example 2 illustrated in FIGS. 11A to 11E, it is not possible to achieve the effect of the present embodiment. Comparative Example 1 has a configuration in which, for example, at the start timing of the pole number switching period TC in a case of switching from 8 poles to 4 poles, the 4-pole command amplitude I4* is increased in a stepwise manner beyond Imax-I8r. FIGS. 10A to 10E correspond to FIGS. 9A to 9E. In Comparative Example 1, the total command amplitude exceeds the limiting current value Imax in the pole number switching period TC.

Comparative Example 2 Illustrated in FIGS. 11A to 11E has a configuration in which, for example, in a case of switching from 8 poles to 4 poles, the timing at which the 4-pole command amplitude I4* is changed in a stepwise manner is delayed compared to the present embodiment. FIGS. 11A to 11E correspond to FIGS. 9A to 9E. In Comparative Example 2, although the total command amplitude may be made to be equal to or less than the limiting current value Imax in the pole number switching period TC, the total torque of the motor 10 is significantly reduced with respect to the total command torque Tr*.

Second Embodiment

Hereinafter, a second embodiment will be described with reference to the drawings, focusing on the differences from the first embodiment. In the present embodiment, the command amplitude after switching is increased in a stepwise manner at the end timing of the pole number switching period TC in addition to the start timing of the pole number switching period TC. Hereinafter, the pole number switching process in a case of switching from 8 poles to 4 poles will be described with reference to FIGS. 12A to 12E. FIGS. 12A to 12E correspond to the previous FIGS. 5A to 5E.

The command value calculating unit 31 calculates the 8-pole command amplitude I8* and the 4-pole command amplitude I4* so that during the pole number switching period TC from time t1 to time t2, the total command amplitude that is the total value of 8-pole command amplitude I8* and 4-pole command amplitude I4* becomes equal to or less than the limiting current value Imax.

At the start timing t1 of the pole number switching period TC, the command value calculating unit 31 starts decreasing the 8-pole command amplitude I8* from the 8-pole initial value before switching I8f and increases the 4-pole command amplitude I4* from 0 toward the rising current value a in a stepwise manner. The rising current value a is a value obtained by subtracting the 8-pole initial value before switching I8f from the limiting current value Imax. The command value calculating unit 31 increases the 4-pole command amplitude I4* in a stepwise manner and then linearly increases the 4-pole command amplitude I4*. The command value calculating unit 31, at the end timing t2 of the pole number switching period TC, increases the 4-pole command amplitude I4* in a stepwise manner toward the 4-pole initial value after switching I4f. In addition, the command value calculating unit 31, at the end timing t2 of the pole number switching period TC, decreases the 8-pole command amplitude I8* in a stepwise manner toward 0. The 4-pole torque Tr4 may be quickly increased by the stepwise increase of the 4-pole command amplitude I4*, and the 8-pole torque Tr8 may be quickly reduced by the stepwise decrease of the 8-pole command amplitude I8*. As a result, it is possible to quickly switch from 8-pole torque Tr8 to 4-pole torque Tr4 while suppressing a decrease in the total torque Trt in the pole number switching period TC. Note that the times t1 to t3 indicate the torque change period Tt.

Figure 12A:
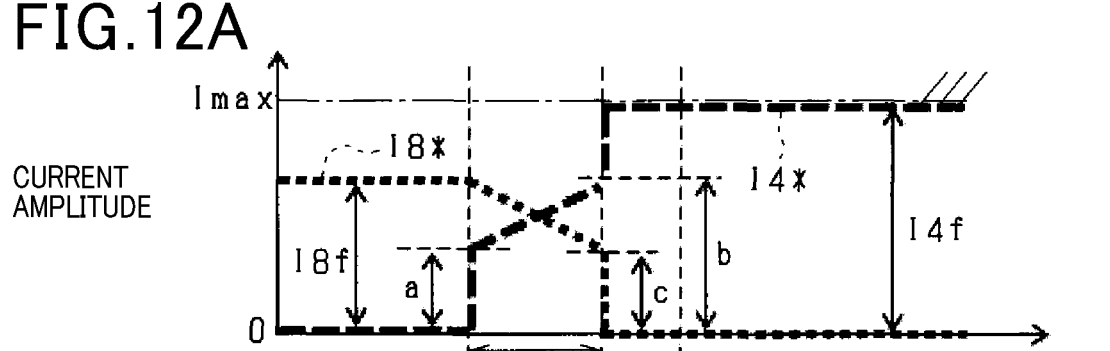
FIGS. 12A to 12E are timing diagrams illustrating a pole number switching mode according to a second embodiment.
Figure 12B:
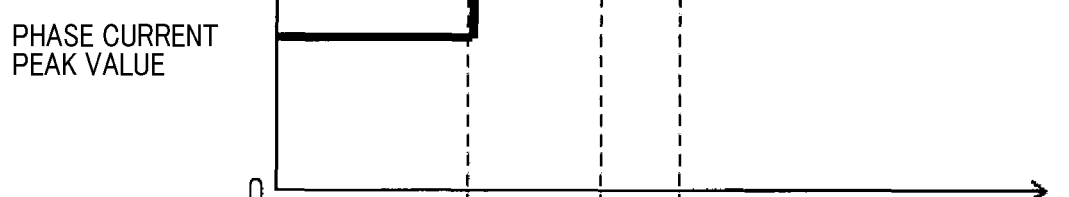
Figure 12C:
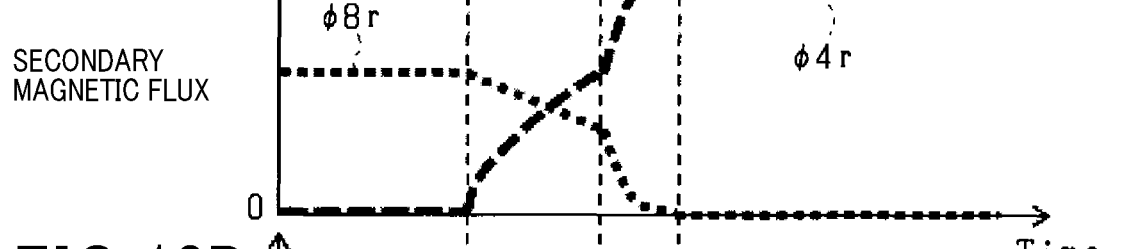
Figure 12D:
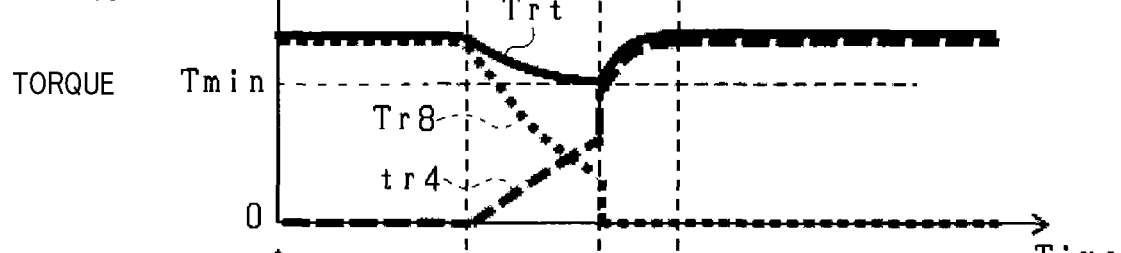
Figure 12E:
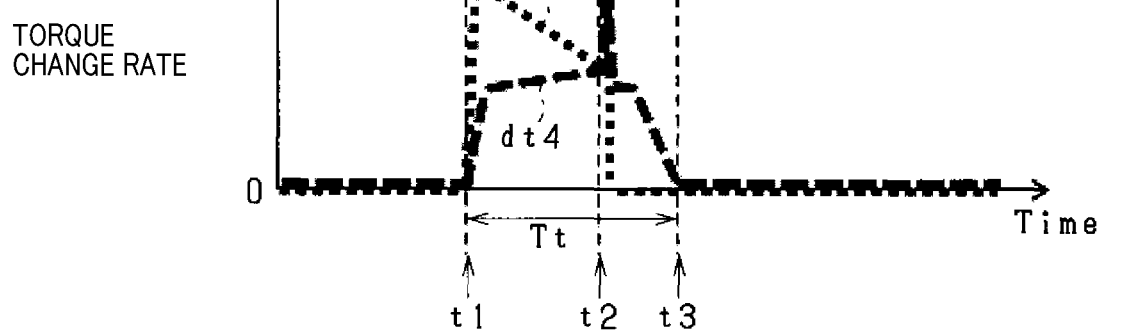
Figure 13:
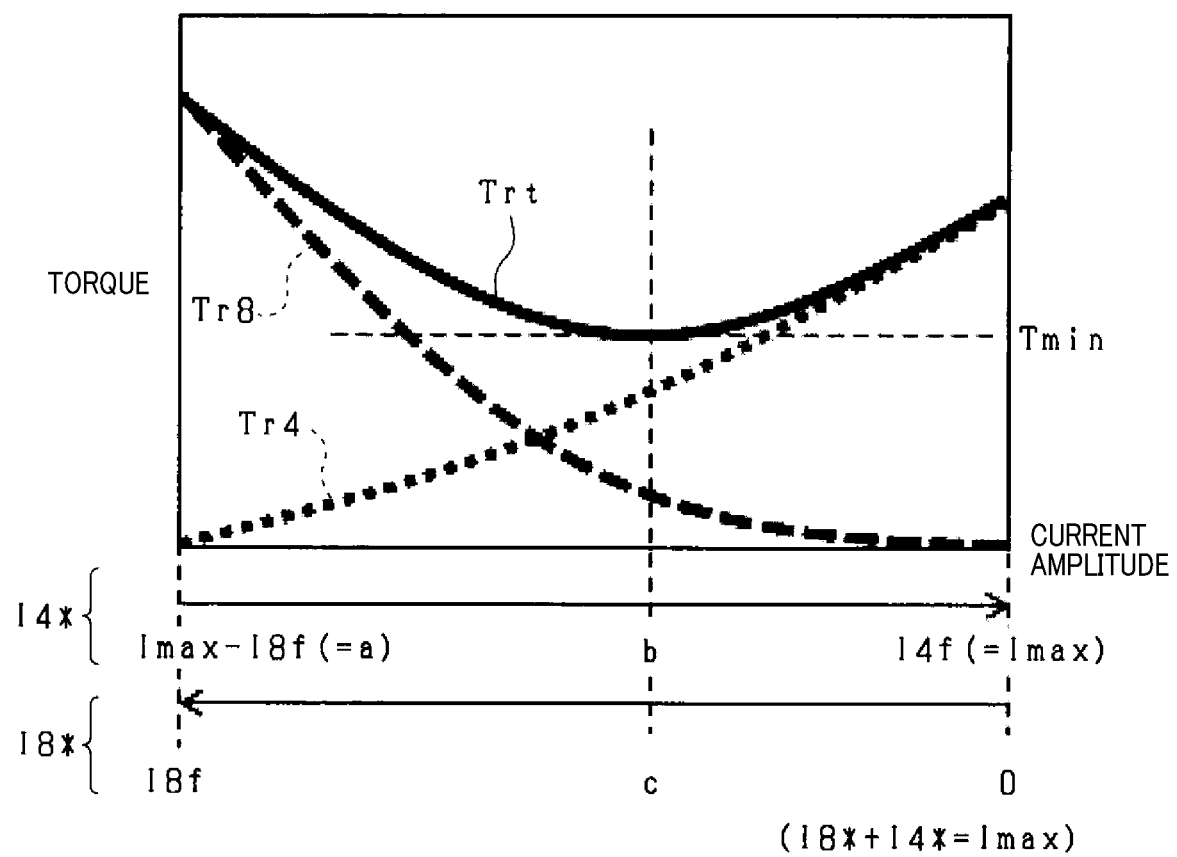
FIG. 13 is a diagram for explaining a minimum torque.

Here, the end timing t2 of the pole number switching period TC, or in other words, the timing at which the 4-pole command amplitude I4* is increased in a stepwise manner is the timing at which the torque of the motor 10 becomes the minimum torque Tmin. In this embodiment, as illustrated in FIG. 13, the minimum torque Tmin is the minimum value that the total torque Trt (=Tr4+Tr8) can take in a case where a condition is imposed that the total command amplitude that is the total value of the 8-pole command amplitude I8* and the 4-pole command amplitude I4* is set to the limiting current value Imax and the possible combinations of the 8-pole command amplitude I8* and the 4-pole command amplitude I4* are changed. At the timing when the torque of the motor 10 reaches the minimum torque Tmin, the 4-pole torque change rate dT4 and the 8-pole torque change rate dT8 become equal as illustrated in FIG. 12E.

The relationship between the current amplitude and the torque illustrated in FIG. 13 is a relationship in a state in which the 8-pole current amplitude converges to the 8-pole command amplitude I8* and the 4-pole current amplitude converges to the 4-pole command amplitude I4*, and the total torque Trt converges to the total command torque Tr*.

The change in the 4-pole command amplitude I4* in a case of switching from 8 poles to 4 poles will be described using FIG. 13. In a case where the 8-pole command amplitude I8* is the 8-pole initial value before switching I8f, the value obtained by subtracting the 8-pole initial value before switching I8f from the limiting current value Imax is the rising current value a at the start timing of the pole number switching period TC. In FIG. 13, the 4-pole command amplitude I4* in a case where the total torque Trt is the minimum torque Tmin is indicated by b, and the 8-pole command amplitude I8* in a case where the total torque Trt is the minimum torque Tmin is indicated by c.

FIG. 13 illustrates a case where the 4-pole initial value after switching I4f becomes the limiting current value Imax. In this case, when the 4-pole command amplitude I4* becomes the 4-pole initial value after switching I4f, the 8-pole command amplitude I8* becomes 0.

Figure 14:
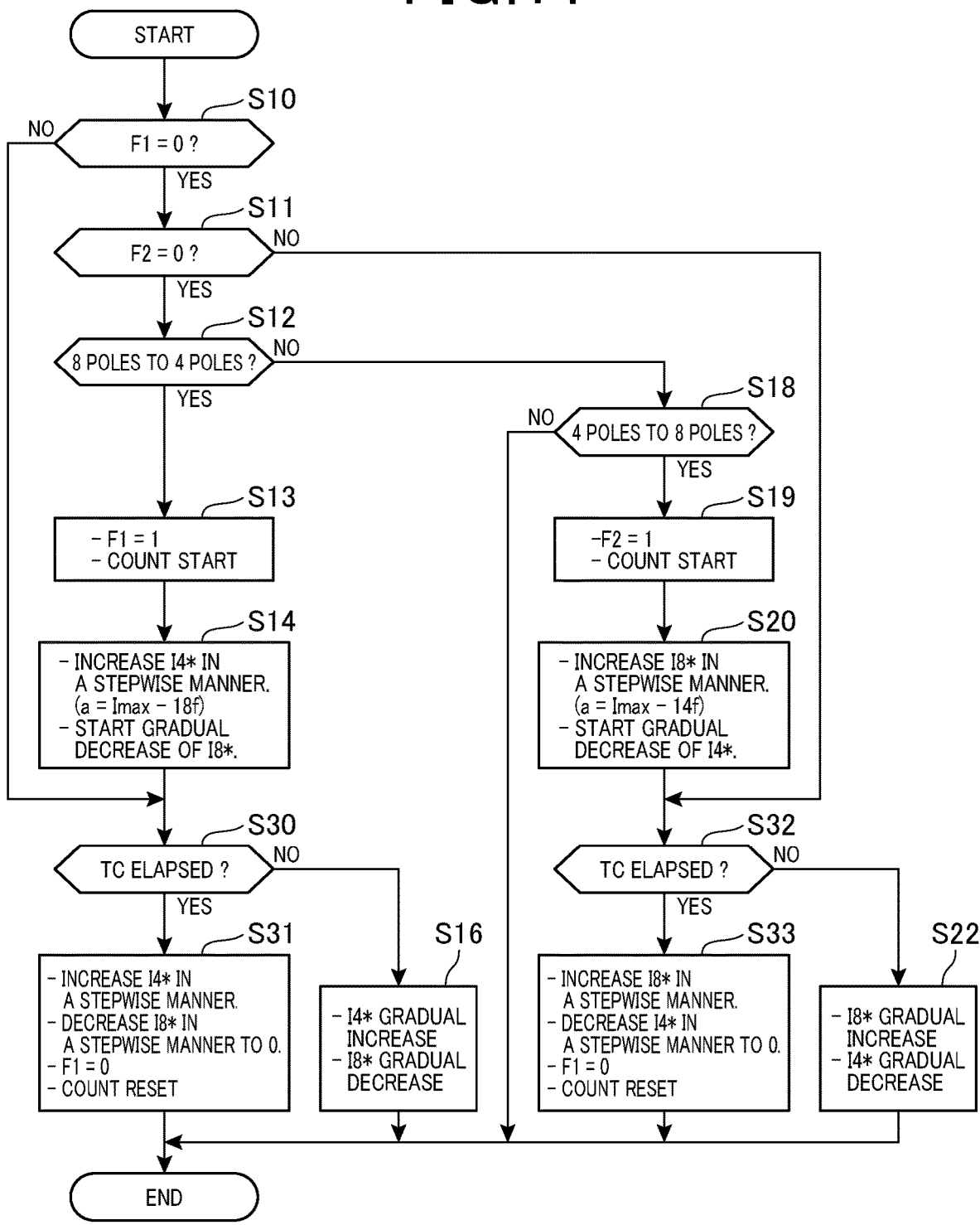
FIG. 14 is a flowchart illustrating a procedure of a pole number switching process.
Figure 15A:
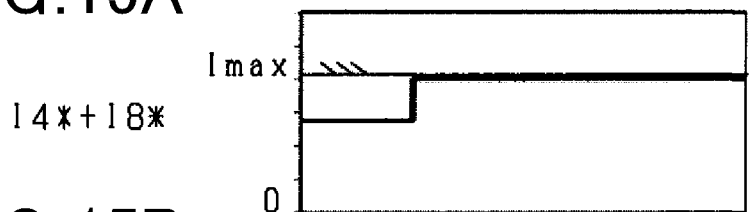
FIGS. 15A to 15F are timing diagrams illustrating a pole number switching mode.
Figure 15B:
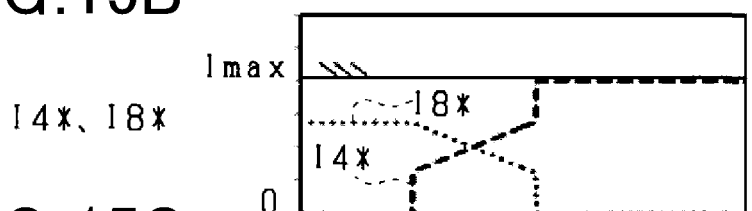
Figure 15C:
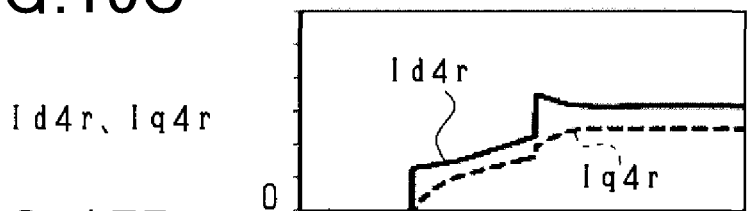
Figure 15D:
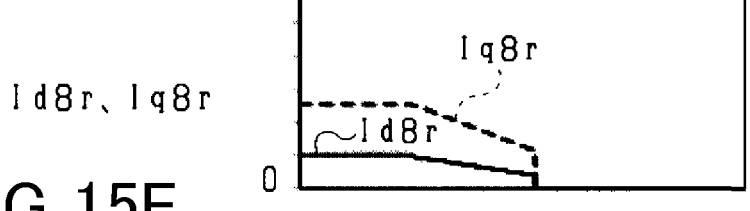
Figure 15E:
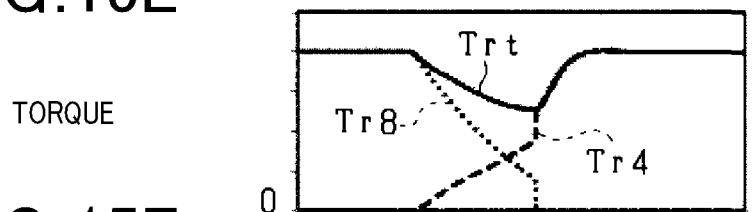
Figure 15F:
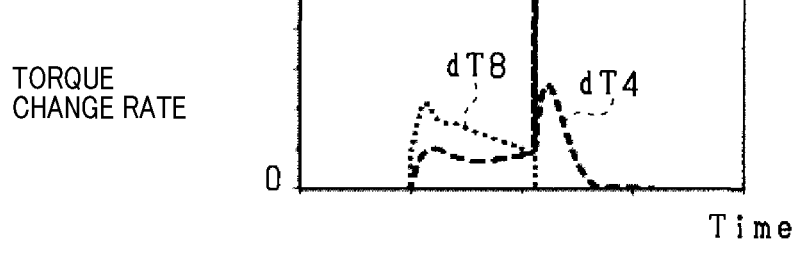

FIG. 14 illustrates the procedure of the pole number switching process according to the present embodiment. This process is repeatedly executed by the command value calculating unit 31, for example, before a predetermined control cycle. Note that, in FIG. 14, the same processes as the processes illustrated in FIG. 8 above are denoted by the same reference numerals for convenience.

In a case where the process of step S14 is completed or in a case where it is determined that the first flag F1 is 1 in step S10, the process proceeds to step S30. In step S30, it is determined whether it is the end timing of the pole number switching period TC. This end timing, as described above, is the timing at which the total torque Trt becomes the minimum torque Tmin. In the present embodiment, in a case where it is determined in step S13 that the elapsed time from the start of counting has reached the determination time, it is determined to be the end timing of the pole number switching period TC. Here, the determination time is a period from the start timing of the pole number switching period TC to the timing when the total torque Trt is assumed to be the minimum torque Tmin, and may be calculated based on map information in which this period is correlated with the 8-pole initial value before switching I8f and the 4-pole initial value after switching I4f.

Note that the process of step S30 may be changed to a process of determining that it is the end timing of the pole number switching period TC in a case where it is determined that the 4-pole command amplitude I4* has reached b illustrated in FIG. 13.

In a case where it is determined in step S30 that it is not the end timing of the pole number switching period TC, the process proceeds to step S16. On the other hand, in a case where it is determined in step S30 that it is the end timing of the pole number switching period TC, the process proceeds to step S31 and the 4-pole command amplitude I4* is changed in a stepwise manner from b toward the 4-pole initial value after switching I4f, and the 8-pole command amplitude I8* is decreased in a stepwise manner from c illustrated in FIG. 13 toward 0. In addition, the first flag F1 is set to 0, and the counted elapsed time is reset to 0.

In a case where the process of step S20 is completed or in a case where it is determined that the second flag F2 is 1 in step S11, the process proceeds to step S32. In step S32, it is determined whether it is the end timing of the pole number switching period TC. This end timing, as described above, is the timing at which the total torque Trt becomes the minimum torque Tmin. In the present embodiment, in a case where it is determined in step S19 that the elapsed time from the start of counting has reached the determination time, it is determined to be the end timing of the pole number switching period TC. Here, the determination time is a period from the start timing of the pole number switching period TC to the timing when the total torque Trt is assumed to be the minimum torque Tmin, and may be calculated based on map information in which this period is correlated with the 4-pole initial value before switching I4f and the 8-pole initial value after switching I8f.

Note that the process of step S32 may be changed to a process of determining that it is the end timing of the pole number switching period TC in a case where it is determined that the 8-pole command amplitude I8* has reached c illustrated in FIG. 13.

In a case where it is determined in step S32 that it is not the end timing of the pole number switching period TC, the process proceeds to step S22. On the other hand, in a case where it is determined in step S32 that it is the end timing of the pole number switching period TC, the process proceeds to step S33 and the 8-pole command amplitude I8* is changed in a stepwise manner from c toward the 8-pole initial value after switching I8f, and the 4-pole command amplitude I4* is decreased in a stepwise manner from b toward 0. In addition, the second flag F2 is set to 0, and the counted elapsed time is reset to 0.

FIGS. 15A to 15F illustrate the transition of each parameter in a case of switching from 8 poles to 4 poles. FIGS. 15A to 15F correspond to FIGS. 9A to 9F described above.

According to the present embodiment, the command amplitude after switching is increased in a stepwise manner at the end timing of the pole number switching period TC. Therefore, the effect of suppressing a decrease in torque of the motor 10 in the pole number switching period TC may be further enhanced.

Moreover, the command amplitude after switching is increased in a stepwise manner and the command amplitude before switching is reduced in a stepwise manner at the timing when it is determined that the total torque Trt of the motor 10 has become the minimum torque Tmin. Before the total torque Trt becomes the minimum torque Tmin, the secondary magnetic flux corresponding to the number of poles after switching does not sufficiently increase, and the secondary magnetic flux corresponding to the number of poles before switching does not sufficiently decrease. When the command amplitude after switching is increased in a stepwise manner and the command amplitude before switching is reduced in a stepwise manner in such a state, the increase in torque corresponding to the number of poles after switching is small, and the decrease in torque corresponding to the number of poles before switching is large, so the decrease in torque becomes large. On the other hand, when the command amplitude after switching is increased in a stepwise manner and the command amplitude before switching is reduced in a stepwise manner after the total torque Trt becomes the minimum torque Tmin, the rise of the torque corresponding to the number of poles after switching will be delayed. However, in the present embodiment, the command amplitude after switching is increased in a stepwise manner and the command amplitude before switching is reduced in a stepwise manner at the timing when it is determined that the total torque Trt becomes the minimum torque Tmin. This makes it possible to increase the command amplitude after switching to the initial value after switching corresponding to the number of poles after switching as early as possible while suppressing a decrease in torque during the pole number switching period TC.

Modification of the Second Embodiment

Figure 16:
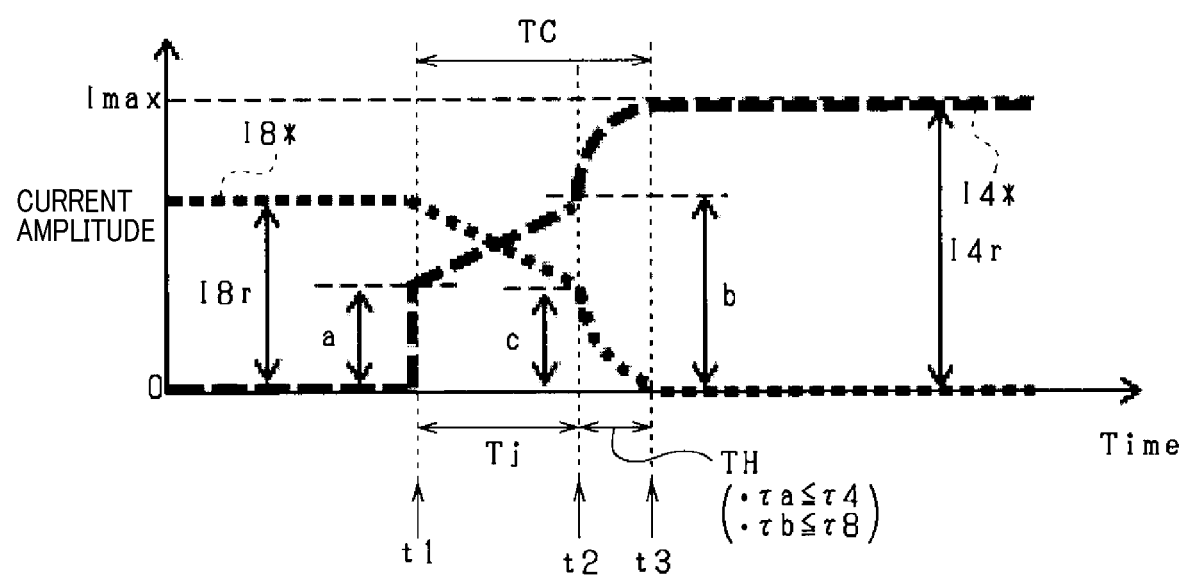
FIG. 16 is a time chart illustrating a pole number switching mode according to a modified example of a second embodiment.

FIG. 16 illustrates a case where the number of poles is changed from 8 poles to 4 poles. As illustrated in FIG. 16, the period from the start timing t1 of the pole number switching period TC to the timing t2 at which the torque of the motor 10 is determined to be the minimum torque Tmin is defined as the specified period Tj. In the period from the end timing t2 of the specified period Tj to the end timing t3 of the pole number switching period TC, the command value calculating unit 31 may gradually increase the 4-pole command amplitude I4* instead of in a stepwise manner. In this case, in the period TH from time t2 to time t3, the 4-pole command amplitude I4* is increased with the responsiveness of the time constant τa of the secondary time constant τ4 or less of the motor 10 corresponding to the 4 poles.

On the other hand, in the period from the end timing t2 of the specified period Tj to the end timing t3 of the pole number switching period TC, the command value calculating unit 31 gradually decreases the 8-pole command amplitude I8* instead of in a stepwise manner. In this case, in the period TH from time t2 to time t3, the 8-pole command amplitude I8* is decreased with the responsiveness of the time constant τb of the secondary time constant τ8 or less of the motor 10 corresponding to the 8 poles.

Figure 17:
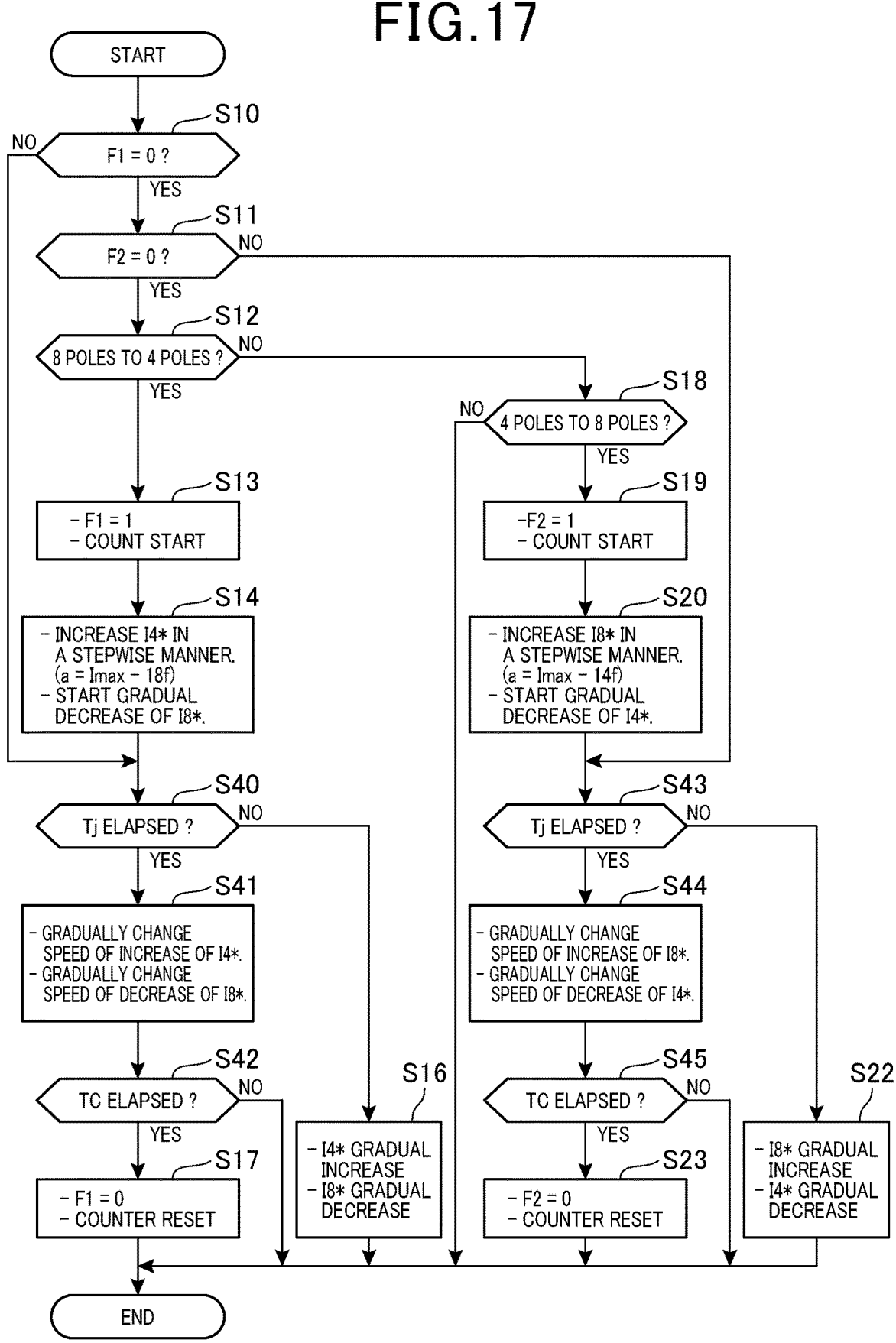
FIG. 17 is a flowchart illustrating a procedure of a pole number switching process.

FIG. 17 illustrates the procedure of the pole number switching process according to the present embodiment. This process is repeatedly executed by the command value calculating unit 31, for example, before a predetermined control cycle. Note that, in FIG. 17, the same processes as the processes illustrated in FIG. 8 above are denoted by the same reference numerals for convenience.

In a case where the process of step S14 is completed or in a case where it is determined that the first flag F1 is 1 in step S10, the process proceeds to step S40. In step S40, it is determined whether it is the end timing of the specified period Tj. This end timing, as illustrated in FIG. 13, is the timing at which the total torque Trt becomes the minimum torque Tmin. In the present embodiment, it is determined whether the elapsed time from the start of counting in step S13 has passed the specified period Tj.

In a case where it is determined in step S40 that it is not the end timing of the specified period Tj, the process proceeds to step S16. On the other hand, in a case where it is determined in step S30 that it is the end timing of the specified period Tj, the process proceeds to step S41, and the speed of gradual increase of the 4-pole command amplitude I4* changes as illustrated from time t2 to t3 in FIG. 16. The speed of gradual increase of the 4-pole command amplitude I4* immediately after the time t2 is higher than the speed of gradual increase of the 4-pole command amplitude I4* immediately before the time t2. Further, the speed of gradual decrease of the 8-pole command amplitude I8* changes as illustrated from time t2 to t3 in FIG. 16. The speed of gradual decrease of the 8-pole command amplitude I8* immediately after the time t2 increases more than the speed of gradual decrease of the 8-pole command amplitude I8* immediately before the time t2.

In step S42, it is determined whether it is the end timing of the pole number switching period TC. This process is similar to the process of step S30 in FIG. 14. In a case where an affirmative determination is made in step S42, the process proceeds to step S17.

In a case where the process of step S20 is completed or in a case where it is determined that the second flag F2 is 1 in step S11, the process proceeds to step S43. In step S43, it is determined whether it is the end timing of the specified period Tj. This end timing, as illustrated in FIG. 13, is the timing at which the total torque Trt becomes the minimum torque Tmin. In the present embodiment, it is determined whether the elapsed time from the start of counting in step S19 has passed the specified period Tj.

In a case where it is determined in step S43 that it is not the end timing of the specified period Tj, the process proceeds to step S22. On the other hand, in a case where it is determined in step S43 that it is the end timing of the specified period Tj, the process proceeds to step S44, and the speed of gradual increase of the 8-pole command amplitude I8* is changes. Moreover, the speed of gradual decrease of the 4-pole command amplitude I4* changes.

In step S45, it is determined whether it is the end timing of the pole number switching period TC. This process is similar to the process of step S32 in FIG. 14. In a case where an affirmative determination is made in step S45, the process proceeds to step S23.

According to the present embodiment described above, it is possible to obtain an effect similar to that of the second embodiment.

Third Embodiment

Figure 18:
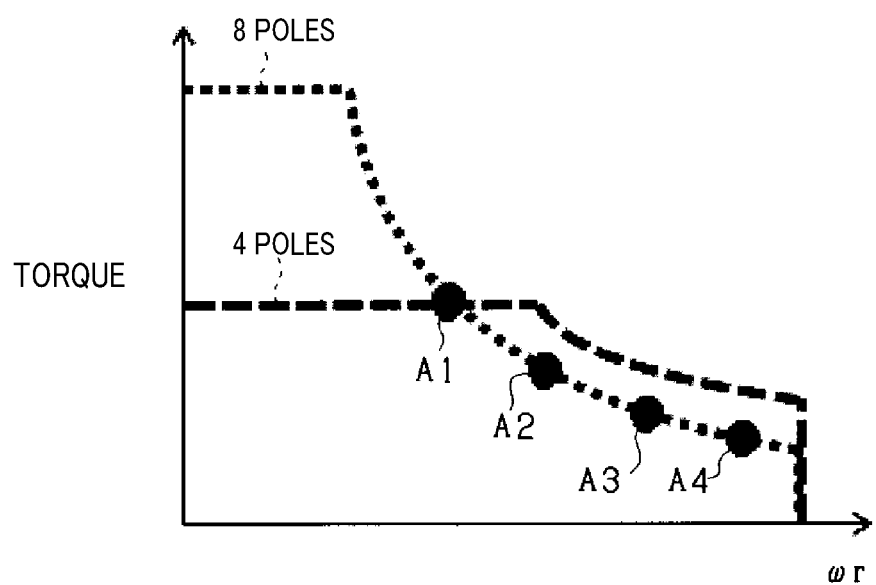
FIG. 18 is a diagram illustrating pole number switching points A1 to A4 according to a third embodiment.

Hereinafter, a third embodiment will be described with reference to the drawings, and focusing on the differences from the first embodiment. In the first embodiment, as illustrated by the first switching point A1 in FIG. 18, the number of poles is switched within the range of the mechanical angular frequency (or that is obtained in a case where the torque of the motor 10 corresponding to 4 poles is the maximum value thereof. In the present embodiment, in addition to the first switching point A1, the number of poles may be switched at the second to fourth switching points A2 to A4 in the range of the mechanical angular frequency (or that is obtained in a case where the torque of the motor 10 corresponding to the 4 poles is less than the maximum value thereof.

A case of switching from 8 poles to 4 poles at the second to fourth switching points A2 to A4 will be described with reference to FIG. 19 to FIG. 21.

Figure 19:
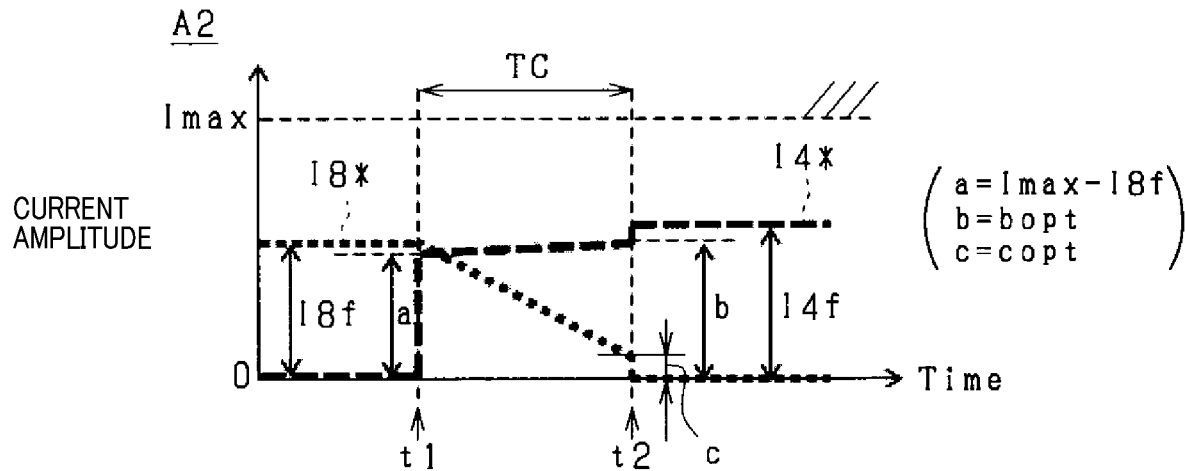
FIG. 19 is a time chart illustrating a pole number switching mode at point A2.

FIG. 19 illustrates the transition of the current amplitude in a case where switching is performed at the second switching point A2.

The example illustrated in FIG. 19 is a case where the current margin value that is a value obtained by subtracting the 8-pole initial value before switching I8f from the limiting current value Imax is smaller than the 4-pole initial value after switching 14f. At the start timing t1 of the pole number switching period TC, the command value calculating unit 31 increases the 4-pole command amplitude I4* in a stepwise manner by just the rising current value a that is the same value as the current margin value, and after that, gradually increases the 4-pole command amplitude I4* until the end timing t2 of the pole number switching period TC. At this end timing t2, the command value calculating unit 31 increases the 4-pole command amplitude I4* in a stepwise manner from b to the 4-pole initial value after switching I4*f*. As illustrated in FIG. 13, b is the 4-pole command amplitude I4* in a case where the total torque Trt is the minimum torque Tmin, and will hereinafter be referred to as the 4-pole reference value bopt.

On the other hand, in the pole number switching period TC, the command value calculating unit 31 gradually decreases the 8-pole command amplitude I8* from the 8-pole initial value before switching I8*f* toward c, and at time t2, decreases the 8-pole command amplitude I8* in a stepwise manner toward 0. As illustrated in FIG. 13, c is the 8-pole command amplitude I8* in a case where the total torque Trt is the minimum torque Tmin, and will hereinafter be referred to as the 8-pole reference value copt.

Figure 20:
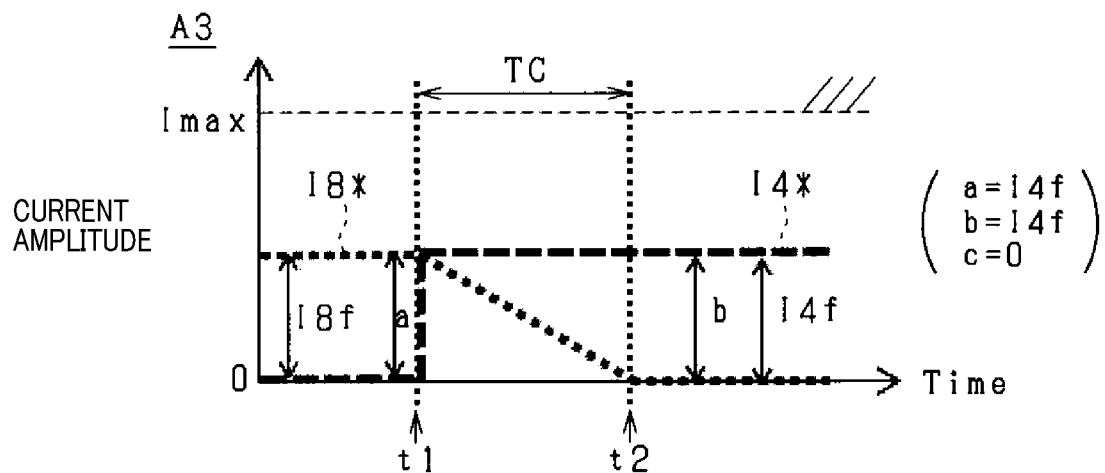
FIG. 20 is a time chart illustrating a pole number switching mode at point A3.

FIG. 20 illustrates the transition of the current amplitude in a case where switching is performed at the third switching point A3.

The example illustrated in FIG. 20 is a case where the current margin value that is a value obtained by subtracting the 8-pole initial value before switching I8*f* from the limiting current value Imax is the same as the 4-pole initial value after switching I4*f*. At the start timing t1 of the pole number switching period TC, the command value calculating unit 31 increases the 4-pole command amplitude I4* in a stepwise manner by just the rising current value a that is the same value as the 4-pole initial value after switching I4*f*, and after that, maintains the 4-pole command amplitude I4* at the 4-pole initial value after switching I4*f* until the end timing t2 of the pole number switching period TC. On the other hand, in the pole number switching period TC, the command value calculating unit 31 gradually decreases the 8-pole command amplitude I8* from the 8-pole initial value before switching I8*f* toward 0. In the example illustrated in FIG. 20, b=I4*f* and c=0. By maintaining the 4-pole command amplitude I4* at a constant value in the pole number switching period TC, it is possible to suppress torque fluctuations of the motor 10 during the pole number switching period TC.

Figure 21:
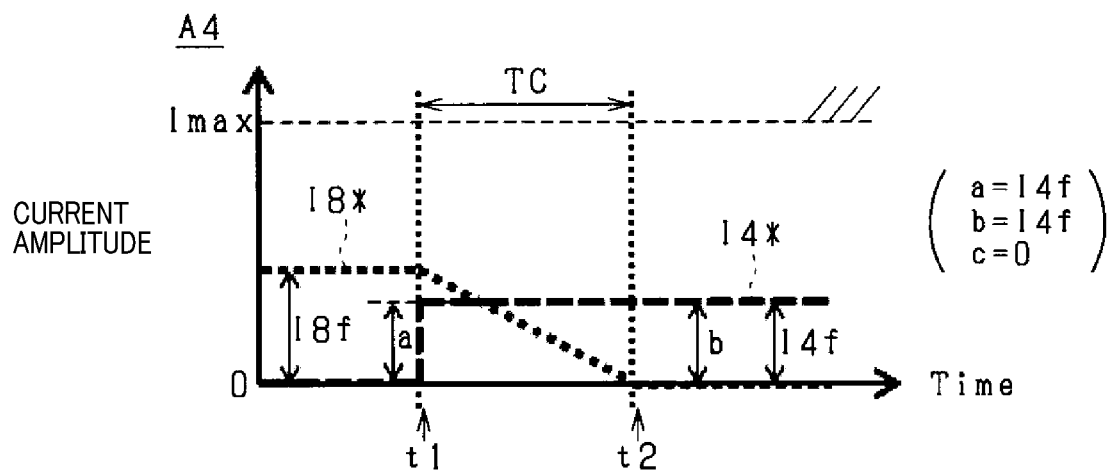
FIG. 21 is a time chart illustrating a pole number switching mode at point A4.

FIG. 21 illustrates the transition of the current amplitude in a case where switching is performed at the fourth switching point A4.

The example illustrated in FIG. 21 is a case where the current margin value that is a value obtained by subtracting the 8-pole initial value before switching I8*f* from the limiting current value Imax is smaller than the 4-pole initial value after switching I4*f*. At the start timing t1 of the pole number switching period TC, the command value calculating unit 31 increases the 4-pole command amplitude I4* in a stepwise manner by just the rising current value a that is the same value as the 4-pole initial value after switching I4*f*, and after that, maintains the 4-pole command amplitude I4* at the 4-pole initial value after switching I4*f* until the end timing t2 of the pole number switching period TC. On the other hand, in the pole number switching period TC, the command value calculating unit 31 gradually decreases the 8-pole command amplitude I8* from the 8-pole initial value before switching I8*f* toward 0. In the example illustrated in FIG. 21, b=I4*f* and c=0.

Figure 22:
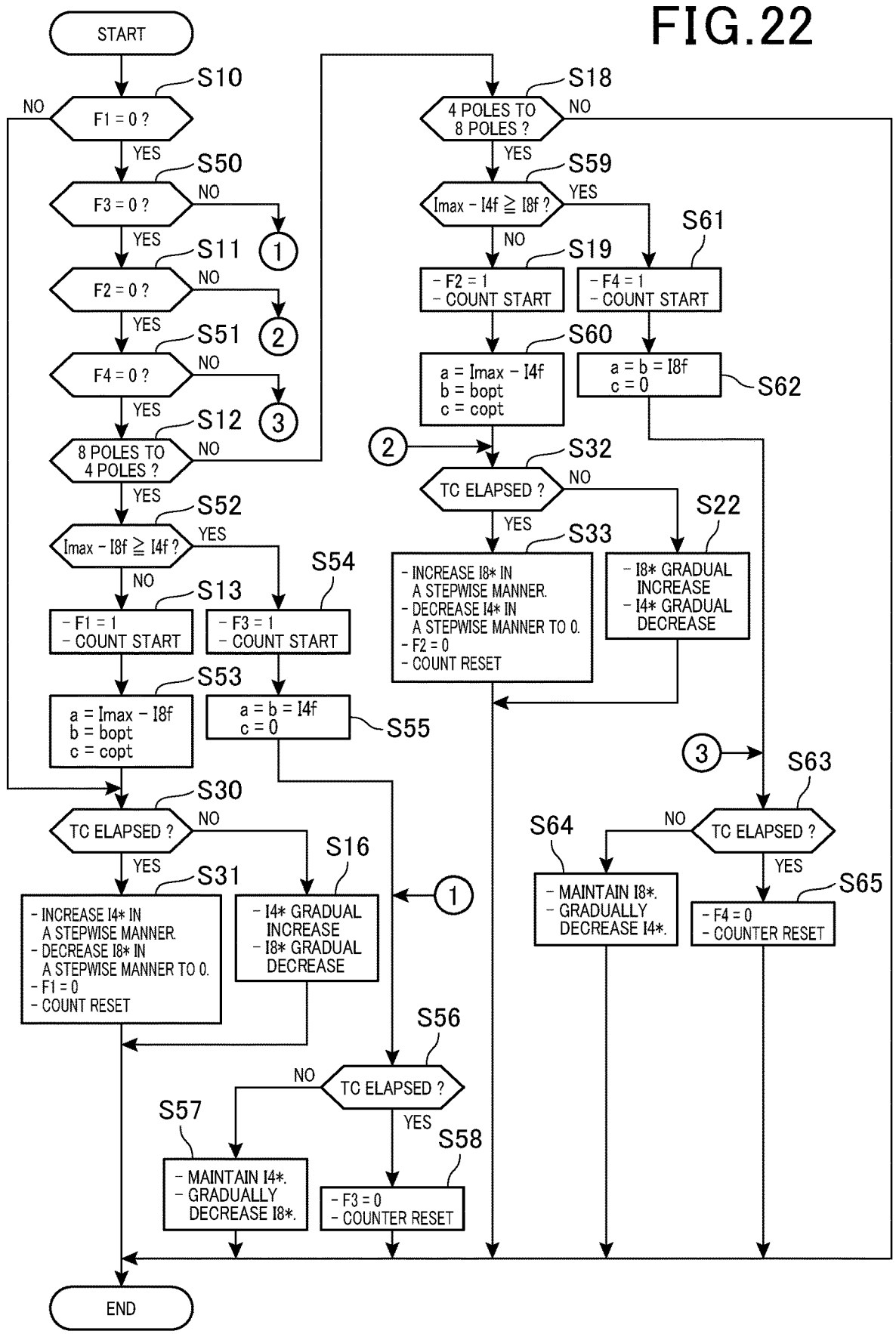
FIG. 22 is a flowchart illustrating a procedure of a pole number switching process.

FIG. 22 illustrates the procedure of the pole number switching process according to the present embodiment. This process is repeatedly executed by the command value calculating unit 31, for example, before a predetermined control cycle. Note that, in FIG. 22, the same processes as the processes illustrated in FIG. 14 above are denoted by the same reference numerals for convenience.

In a case where it is determined in step S10 that the first flag F1 is 0, the process proceeds to step S50, and it is determined whether a third flag F3 is 0. The third flag F3, by the value being set to 1, indicates that switching from 8 poles to 4 poles has been instructed, and that a negative determination has been made in step S52 described later, and by the value being set to 0, indicates that switching from 8 poles to 4 poles has been instructed, and that an affirmative determination has been made in step S52. In this embodiment, the initial value of the third flag F3 is 0.

In a case where it is determined in step S50 that the third flag F3 is 0, the process proceeds to step S11. In a case where it is determined in step S11 that the second flag F2 is 0, the process proceeds to step S51, and it is determined whether a fourth flag F4 is 0. The fourth flag F4, by the value being set to 1, indicates that switching from 4 poles to 8 poles has been instructed, and that a negative determination has been made in step S59 described later, and by the value being set to 0, indicates that switching from 4 poles to 8 poles has been instructed, and that an affirmative determination has been made in step S59. In this embodiment, the initial value of the fourth flag F4 is 0.

In a case where it is determined in step S51 that the fourth flag F4 is 0, the process proceeds to step S12. In a case where an affirmative determination is made in step S12, the process proceeds to step S52. In step S52, it is determined whether the current margin value that is a value obtained by subtracting the 8-pole initial value before switching I8*f* from the limiting current value Imax, is greater than or equal to the 4-pole initial value after switching I4*f*.

In a case where a negative determination is made in step S52, the process proceeds to step S53 via step S13. In step S53, the rising current value a is set to the current margin value calculated in step S52, and b=bopt and c=copt.

In a case where the process of step S53 is completed or in a case where it is determined that the first flag F1 is 1 in step S10, the process proceeds to step S30.

In a case where an affirmative decision is made in step S52, the process proceeds to step S54, and the third flag F3 is set to 1. Moreover, counting of the elapsed time after the instruction to switch from 8 poles to 4 poles starts.

In step S55, the rising current values a and b are set to the 4-pole initial value after switching I4*f*, and c=0.

In a case where the process of step S55 is completed or in a case where it is determined that the third flag F3 is 1 in step S50, the process proceeds to step S56. In step S56, it is determined whether it is the end timing of the pole number switching period TC. The process of step S56 may be performed by the same method as the process of step S30.

In a case where a negative determination is made in step S56, the process proceeds to step S57, where the 4-pole command amplitude I4* is maintained at the 4-pole initial value after switching I4*f*, and the 8-pole command amplitude I8* is gradually reduced. On the other hand, in a case where an affirmative determination is made in step S56, the process proceeds to step S58, the third flag F3 is set to 0, and the counted elapsed time is reset to 0.

In a case where a negative determination is made in step S12 and an affirmative determination is made in step S18, the process proceeds to step S59, and it is determined whether the current margin value that is a value obtained by subtracting the 4-pole initial value before switching I4*f* from the limiting current value Imax is equal to or greater than the 8-pole initial value after switching I8*f*.

In a case where a negative determination is made in step S59, the process proceeds to step S60 via step S19. In step S60, the rising current value a is set to the current margin value calculated in step S59, and b=bopt and c=copt.

In a case where the process of step S60 is completed or in a case where it is determined that the second flag F2 is 1 in step S11, the process proceeds to step S32.

In a case where an affirmative decision is made in step S59, the process proceeds to step S61, and the fourth flag F4 is set to 1. Moreover, counting of the elapsed time after the instruction to switch from 4 poles to 8 poles starts.

In step S62, the rising current values a and b are set to the 8-pole initial value after switching I8f, and c=0.

In a case where the process of step S62 is completed or in a case where it is determined that the fourth flag F4 is 1 in step S51, the process proceeds to step S63. In step S63, it is determined whether it is the end timing of the pole number switching period TC. The process of step S63 may be performed by the same method as the process of step S32.

In a case where a negative determination is made in step S63, the process proceeds to step S64, here the 8-pole command amplitude I8* is maintained at the 8-pole initial value after switching I8f, and the 4-pole command amplitude I4* is gradually reduced. On the other hand, in a case where an affirmative determination is made in step S63, the process proceeds to step S65, the fourth flag F4 is set to 0, and the counted elapsed time is reset to 0.

According to the present embodiment described above, the command amplitude before switching and the command amplitude after switching in the pole number switching period TC may be appropriately calculated according to the operating point for switching the number of poles.

Other Embodiments

Note that the embodiments described above may be modified and implemented as described below.

The manner of increasing the command amplitude after switching is not limited to a stepwise increase of the command amplitude after switching at the start timing of the pole number switching period TC. Hereinafter, a case of switching from 8 poles to 4 poles will be described as an example with reference to FIG. 23 to FIG. 25. In the examples illustrated in FIG. 23 to FIG. 25, in the pole number switching period TC, the total command amplitude is equal to or less than the limiting current value Imax.

Figure 23:
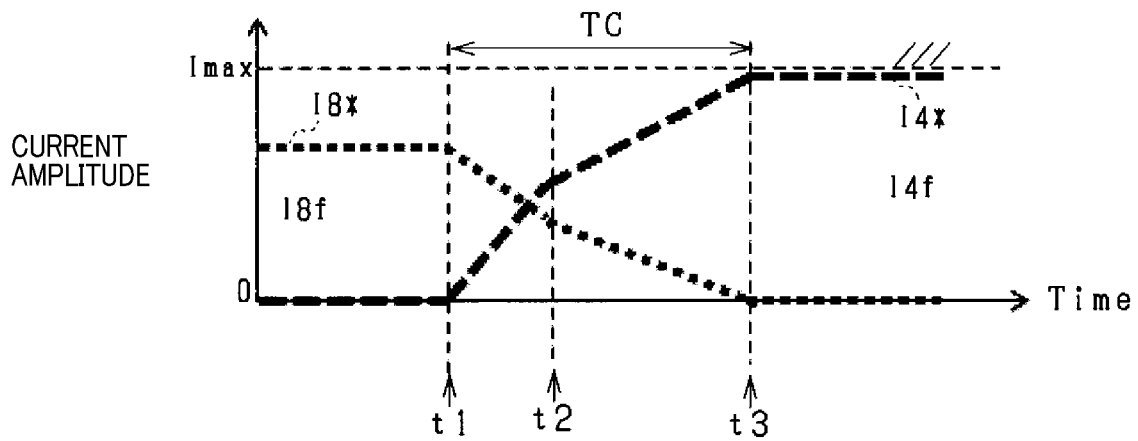
FIG. 23 is a time chart illustrating a pole number switching mode according to another embodiment.

As illustrated in FIG. 23, the command value calculating unit 31 linearly increases the 4-pole command amplitude I4* in the period from the start timing t1 to the time t2 of the pole number switching period TC. The 4-pole command amplitude I4* at time t2 is a value obtained by subtracting the 8-pole initial value before switching I8f from the limiting current value Imax. In the period from time t2 to the end timing t3 of the pole number switching period TC, the command value calculating unit 31 linearly increases the 4-pole command amplitude I4* at a speed of increase lower than the speed of increase of the 4-pole command amplitude I4* in the period of t1 to t2. Here, the period from t1 to t2 corresponding to a first period is shorter than the period from t2 to t3 corresponding to a second period. By making the speed of increase of the 4-pole command amplitude I4* in the period t1 to t2 higher than the speed of increase of the 4-pole command amplitude I4* in the period t2 to t3, the 4-pole command amplitude I4* may be appropriately increased to □Imax−I8f at time t2. Moreover, by setting the period t1 to t2 to be shorter than the period t2 to t3, the secondary magnetic flux φ4r of the 4 poles may be rapidly increased. As a result, according to the example illustrated in FIG. 23, it is possible to suppress a decrease in torque of the motor 10 in the pole number switching period TC.

Figure 24:
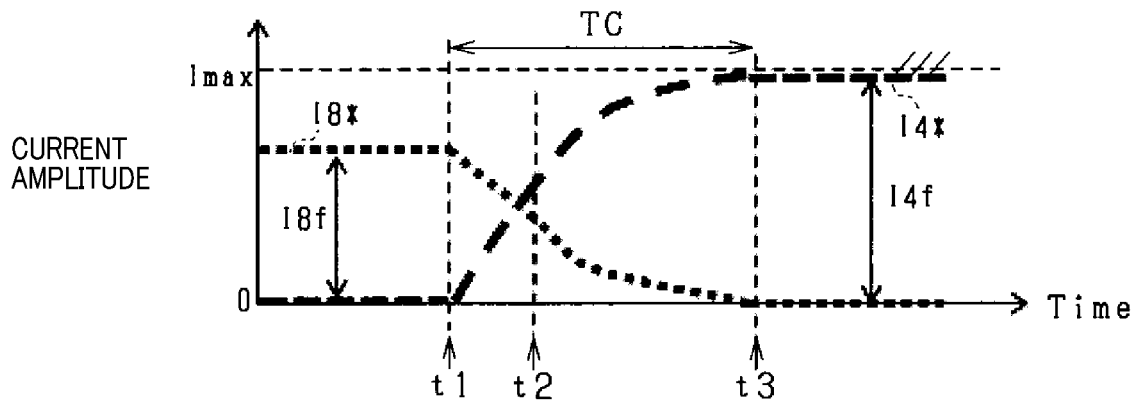
FIG. 24 is a time chart illustrating a pole number switching mode according to another embodiment.

The example illustrated in FIG. 24 differs from the example illustrated in FIG. 23 in that the manner of increasing the 4-pole command amplitude I4* and the manner of decreasing the 8-pole command amplitude I8* during the period from t2 to t3 are different. More specifically, in the period t2 to t3, the speed of increase of the 4-pole command amplitude I4* is gradually decreased and the speed of decrease of the 8-pole command amplitude I8* is gradually decreased.

Figure 25:
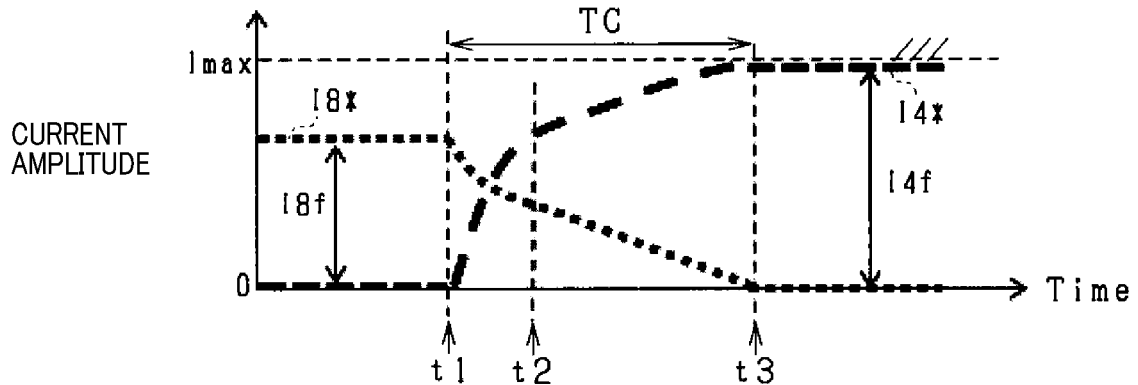
FIG. 25 is a time chart illustrating a pole number switching mode according to another embodiment.

The example illustrated in FIG. 25 differs from the example illustrated in FIG. 23 in that the manner of increasing the 4-pole command amplitude I4* and the manner of decreasing the 8-pole command amplitude I8* during the period from t1 to t2 are different. More specifically, in the period t1 to t2, the speed of increase of the 4-pole command amplitude I4* is gradually decreased and the speed of decrease of the 8-pole command amplitude I8* is gradually decreased.

In the second embodiment, it is not essential to increase the command amplitude after switching in a stepwise manner at the start timing of the pole number switching period TC. Hereinafter, a case of switching from 8 poles to 4 poles will be described as an example with reference to FIG. 26.

Figure 26:
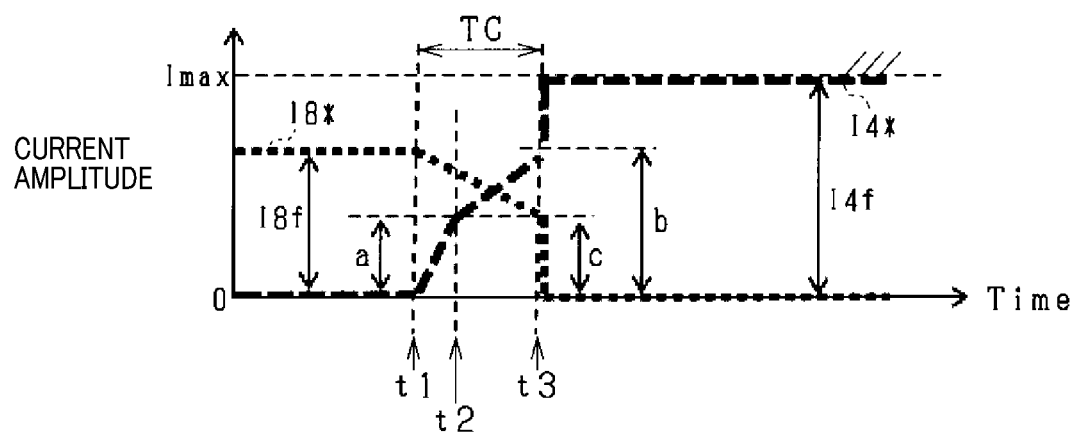
FIG. 26 is a time chart illustrating a pole number switching mode according to another embodiment.

As illustrated in FIG. 26, the command value calculating unit 31 linearly increases the 4-pole command amplitude I4* in the period from the start timing t1 to the time t2 of the pole number switching period TC. The 4-pole command amplitude I4* at the time t2 is the rising current value a described in the second embodiment. In the period from time t2 to the end timing t3 of the pole number switching period TC, the command value calculating unit 31 linearly increases the 4-pole command amplitude I4* at a speed of increase lower than the speed of increase of the 4-pole command amplitude I4* in the period of t1 to t2. Here, the period from t1 to t2 is shorter than the period from t2 to t3.

Figure 27:
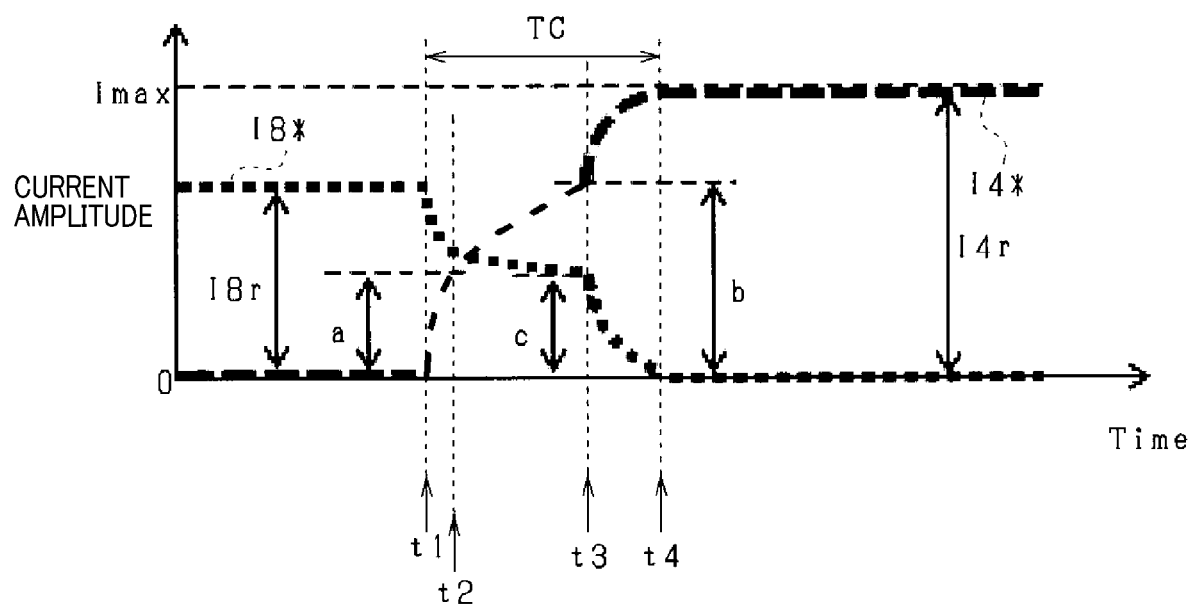
FIG. 27 is a time chart illustrating a pole number switching mode according to another embodiment.

In the second embodiment, it is not essential to increase the command amplitude after switching in a stepwise manner at the end timing of the pole number switching period TC. Hereinafter, a case of switching from 8 poles to 4 poles will be described as an example with reference to FIG. 27.

Of the pole number switching period TC, the period from the start timing t1 to t2 of the period is taken to be a first period, the period from t2 to t3 is taken to be a second period, and the period from t3 to t4 is taken to be a third period. The first and third periods are shorter than the second period. The command value calculating unit 31 makes the minimum value of the speed of increase of the 4-pole command amplitude I4* in each of the first period and the third period higher than the maximum value of the speed of increase of the 4-pole command amplitude I4* in the second period. Here, the time t3 may be the timing when it is determined that the total torque Trt becomes the minimum torque Tmin.

In FIG. 5A of the first embodiment, the amount by which the 4-pole command amplitude I4* is increased in a stepwise manner at time t1 may be less than the value obtained by subtracting the 8-pole initial value before switching I8f from the limiting current value Imax.

The start timing of increasing the command amplitude after switching may be different from the start timing of decreasing the command amplitude before switching. For example, the start timing of decreasing the command amplitude before switching may be timing after the start timing of increasing the command amplitude after switching.

In the pole number switching period TC, the control amount that is controlled so that the total value of the current amplitude before switching and the current amplitude after switching does not exceed the limiting current value Imax is not limited to the current, and for example, may be the applied voltage of the stator windings or It may be the torque of the motor.

As the motor, a motor having four or more phases may be used. Also, three or more sets of stator windings may be provided in the stator.

When A is an even number of 2 or more, the set of the number of poles of the motor capable of being switched may be a set of A poles and "n×A" poles. Therefore, the set of the number of poles is not limited to a set of 4 poles and 8 poles; for example, when n=2, the set may be 2 poles and 4 poles or may be a set of 8 poles and 16 poles.

The number of poles of the motor that may be switched is not limited to two and may be three or more. For example, in the case of a motor that may switch between 4 poles, 8 poles and 16 poles, when switching from one of 4 poles and 8 poles to the other and when switching from one of 8 poles and 16 poles to the other, the pole number switching process described above may be applied.

The motor is not limited to the one used as an on-vehicle main motor, and may be, for example, a motor used as an on-vehicle auxiliary motor. Moreover, a system in which a motor and an inverter are provided is not limited to a system mounted in a vehicle.

The present disclosure has been described with reference to exemplary embodiments, however, it is understood that the present disclosure is not limited to such exemplary embodiments and structures. The present disclosure also includes various modifications and modifications within an equivalent range. In addition, various combinations and forms, and furthermore, other combinations and forms including only one element, or more or less than that are also within the scope and spirit of the present disclosure.

(Conclusion)

It is a main object of the present disclosure to provide a control device for a pole-number switching electric motor that is able to suppress an increase in the peak value of the current flowing in the stator windings.

As a first disclosure, a control device for a pole-number switching electric motor applied to a system including an electric motor capable of switching a number of poles, and an inverter electrically connected to stator windings of the electric motor; includes: a basic operation unit that, in a case where a magnitude of a current vector flowing in the stator winding is a current amplitude, and when there is a drive instruction for a number of poles before switching, operates the inverter to control the current amplitude before switching that is the current amplitude corresponding to the number of poles before switching, and when there is a drive instruction for a number of poles after switching, operates the inverter to control the current amplitude after switching that is the current amplitude corresponding to the number of poles after switching; and a switching operation unit that, in a case of an instruction to switch from the number of poles before switching to the number of poles after switching, in a pole number switching period, operates the inverter to reduce the current amplitude before switching and increase the current amplitude after switching; wherein the switching operation unit, in the pole number switching period, operates the inverter so that a total value of the current amplitude before switching and the current amplitude after switching does not exceed a limiting current value.

The basic operation unit of the first disclosure, in a case where there is a drive instruction for the number of poles before switching, operates the inverter to control the current amplitude before switching, and in a case where there is a drive instruction for the number of poles after switching, operates the inverter to control the current amplitude after switching. Moreover, the switching operation unit of the first disclosure, in a case where there is an instruction to switch from the number of poles before switching to the number of poles after switching, in the pole number switching period, operates the inverter to decrease the current amplitude before switching and increase the current amplitude after switching. As a result, the number of poles of the electric motor is switched from the number of poles before switching to the number of poles after switching.

In this case, the switching operation unit, in the pole number switching period, operates the inverter so that the total value of the current amplitude before switching and the current amplitude after switching does not exceed a limiting current value. Therefore, in the pole number switching period, it is possible to suppress an increase in the peak value of the current flowing in the stator windings.

In a second disclosure, in a case where a command value of the current amplitude before switching is taken to be a command amplitude before switching, and a command value of the current amplitude after switching is taken to be a command amplitude after switching, the basic operation unit, when there is a drive instruction for the number of poles before switching, operates the inverter to control the current amplitude before switching to the command amplitude before switching, and when there is a drive instruction for the number of poles after switching, operates the inverter to control the current amplitude after switching to the command amplitude after switching; in a case where the command amplitude after switching at end timing of the pole number switching period is taken to be an initial value after switching, the switching operation unit increases the command amplitude after switching toward the initial value after switching, and decreases the command amplitude before switching toward 0; and in a case where of the pole number switching period, a first period starting from a start timing of that period is taken to be a first period, a period that is a remaining period following the first period and that is longer than the first period is taken to be a second period, the switching operation unit sets a maximum value of a speed of increase of the command amplitude after switching in the first period to be greater than a maximum value of a speed of increase of the command amplitude after switching in a period of the second period that does not include the end timing of the pole number switching period.

The switching operation unit of the second disclosure increases the command amplitude after switching toward the initial value after switching, and decreases the command amplitude before switching toward 0. In this case, the maximum value of the speed of increase of the command amplitude after switching in the first period that is shorter than the second period becomes higher than the maximum value of the speed of increase of the command amplitude after switching in the second period. Therefore, it is possible to rapidly increase the current amplitude after switching from the start timing of the pole number switching period, and it is possible to rapidly increase a secondary magnetic flux corresponding to the number of poles after switching.

Accordingly, it is possible to increase the effect of suppressing a drop in torque of the electric motor in the pole number switching period.

In a third disclosure, the switching operation unit, at the start timing of the pole number switching period, increases the command amplitude after switching in a stepwise manner, and then at the end timing of the pole number switching period, gradually increases the command amplitude after switching so that the command amplitude after switching becomes the initial value after switching.

In the third disclosure, the command amplitude after switching is increased in a stepwise manner at the start timing of the pole number switching period. Therefore, it is possible to more rapidly increase the current amplitude after switching from the start timing of the pole number switching period, and it is possible to more rapidly increase the secondary magnetic flux corresponding to the pole number after switching. Accordingly, it is possible to further increase the effect of suppressing a drop in torque of the electric motor in the pole number switching period.

What is claimed is:

1. A control device for a pole-number switching electric motor applied to a system including an electric motor capable of switching a number of poles, and an inverter electrically connected to stator windings of the electric motor; comprising:
    a basic operation unit that, in a case where a magnitude of a current vector flowing in the stator windings is a current amplitude, and when there is a drive instruction for a number of poles before switching, operates the inverter to control the current amplitude before switching that is the current amplitude corresponding to the number of poles before switching, and when there is a drive instruction for a number of poles after switching, operates the inverter to control the current amplitude after switching that is the current amplitude corresponding to the number of poles after switching; and
    a switching operation unit that, in a case of an instruction to switch from the number of poles before switching to the number of poles after switching, in a pole number switching period, operates the inverter to reduce the current amplitude before switching and increase the current amplitude after switching; wherein
    the switching operation unit, the pole number switching period, operates the inverter so that a total value of the current amplitude before switching and the current amplitude after switching does not exceed a limiting current value.

2. The control device for a pole-number switching electric motor according to claim 1, wherein
    in a case where a command value of the current amplitude before switching is taken to be a command amplitude before switching, and a command value of the current amplitude after switching is taken to be a command amplitude after switching, the basic operation unit, when there is a drive instruction for the number of poles before switching, operates the inverter to control the current amplitude before switching to the command amplitude before switching, and when there is a drive instruction for the number of poles after switching, operates the inverter to control the current amplitude after switching to the command amplitude after switching;
    in a case where the command amplitude after switching at end timing of the pole number switching period is taken to be an initial value after switching, the switching operation unit increases the command amplitude after switching toward the initial value after switching, and decreases the command amplitude before switching toward 0; and
    in a case where of the pole number switching period, a first period starting from a start timing of that period is taken to be a first period, a period that is a remaining period following the first period and that is longer than the first period is taken to be a second period, the switching operation unit sets a maximum value of a speed of increase of the command amplitude after switching in the first period to be greater than a maximum value of a speed of increase of the command amplitude after switching in a period of the second period that does not include the end timing of the pole number switching period.

3. The control device for a pole-number switching electric motor according to claim 2, wherein
    the switching operation unit, at the start timing of the pole number switching period, increases the command amplitude after switching in a stepwise manner, and then at the end timing of the pole number switching period, gradually increases the command amplitude after switching so that the command amplitude after switching becomes the initial value after switching.

4. The control device for a pole-number switching electric motor according to claim 3, wherein
    the switching operation unit sets an increase amount of the command amplitude after switching at the start timing of the pole number switching period to a value obtained by subtracting the initial value before switching that is the command amplitude before switching at the start timing of the pole number switching period from the limiting current value.

5. The control device for a pole-number switching electric motor according to claim 2, wherein
    the switching operation unit, in the pole number switching period, increases the command amplitude after switching with a responsiveness equal to or higher than responsiveness of a secondary time constant of the electric motor corresponding to the number of poles after switching.

6. The control device for a pole-number switching electric motor according to claim 2, wherein
    in a case where the command amplitude before switching at the start timing of the pole number switching period is the initial value before switching, and in a case where a current margin value that is a value obtained by subtracting the initial value before switching that is the command amplitude before switching at the start timing of the pole number switching period from the limiting current value, is smaller than the initial value after switching, the switching operation unit, at the start timing of the pole number switching period, increases the command amplitude after switching in a stepwise manner, and then gradually increases the command amplitude after switching, and at the end timing of the pole number switching period, increases the command amplitude after switching in a stepwise manner toward the initial value after switching.

7. The control device for a pole-number switching electric motor according to claim 6, wherein
    in the case where a possible combination of command amplitude before switching and the command amplitude after switching is changed by imposing a condition that an added value of the initial value before switching and the initial value after switching is constant, and when a total value of torque of the electric motor corresponding to the number of poles before switching and torque of the electric motor corresponding to the number of poles after switching is taken to be a minimum torque, the switching operation unit determines timing when the torque of the electric motor reaches the minimum torque to be the end timing of the pole number switching period, and at the determined timing, increases the command amplitude after switching in a stepwise manner toward the initial value after switching.

8. The control device for a pole-number switching electric motor according to claim 6, wherein
the switching operation unit, in a case where the current margin value is smaller than the initial value after switching, at the end timing of the pole number switching period, decreases the command amplitude before switching in a stepwise manner toward 0.

9. The control device for a pole-number switching electric motor according to claim 6, wherein
the switching operation unit, in a case where the current margin value is equal to or greater than the initial value after the switching, at the start timing of the pole number switching period, increases the command amplitude after switching in a stepwise manner toward the initial value after switching, and after that, maintains the command amplitude after switching at the initial value after switching until the end timing of the pole number switching period.

10. The control device for a pole-number switching electric motor according to claim 1, wherein
in a case where a command value of the current amplitude before switching is taken to be a command amplitude before switching, and a command value of the current amplitude after switching is taken to be a command amplitude after switching, the basic operation unit, when there is a drive instruction for the number of poles before switching, operates the inverter to control the current amplitude before switching to the command amplitude before switching, and when there is a drive instruction for the number of poles after switching, operates the inverter to control the current amplitude after switching to the command amplitude after switching;

in a case where the command amplitude after switching at end timing of the pole number switching period is taken to be an initial value after switching, the switching operation unit increases the command amplitude after switching toward the initial value after switching, and decreases the command amplitude before switching toward 0; and in a case where of the pole number switching period, a first period starting from the start timing of the period is taken to be a first period, a period following the first period and longer than the first period is taken to be a second period, and a remaining period following the second period and shorter than the second period is defined as a third period, the switching operation unit sets a minimum value of a speed of increase of the command amplitude after switching in each of the first period and the third period to be higher than a maximum value of a speed of increase of the command amplitude after switching in the second period.

* * * * *